(12) United States Patent
Kai

(10) Patent No.: US 7,389,691 B2
(45) Date of Patent: Jun. 24, 2008

(54) ACCELERATION SENSOR

(75) Inventor: Takayuki Kai, Miyasaki (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 139 days.

(21) Appl. No.: 11/295,500

(22) Filed: Dec. 7, 2005

(65) Prior Publication Data
US 2006/0130577 A1    Jun. 22, 2006

(30) Foreign Application Priority Data
Dec. 22, 2004    (JP)    ............... 2004-371158

(51) Int. Cl.
*G01P 15/12*    (2006.01)
(52) U.S. Cl. .................. 73/514.36; 73/514.33
(58) Field of Classification Search ............. 73/514.33, 73/514.36, 514.38
See application file for complete search history.

(56) References Cited

U.S. PATENT DOCUMENTS
5,777,227 A * 7/1998 Cho et al. ............... 73/514.38

FOREIGN PATENT DOCUMENTS
JP    2004-198243    7/2004

* cited by examiner

*Primary Examiner*—John E Chapman
(74) *Attorney, Agent, or Firm*—Rabin & Berdo, PC

(57) ABSTRACT

A acceleration sensor includes a supporting part, a beam part connected to the supporting part, a weight part connected to the beam part, and a protruding part formed beneath the beam part so that the protruding part supports the beam part. With such an arrangement, the adjustment of the sensitivity of the acceleration sensor can be easily performed, as well as the evaluation of the acceleration sensor.

18 Claims, 21 Drawing Sheets

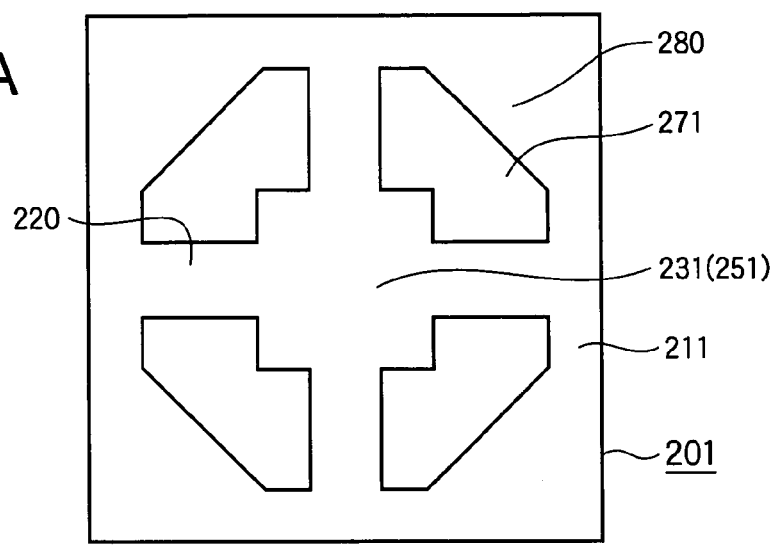
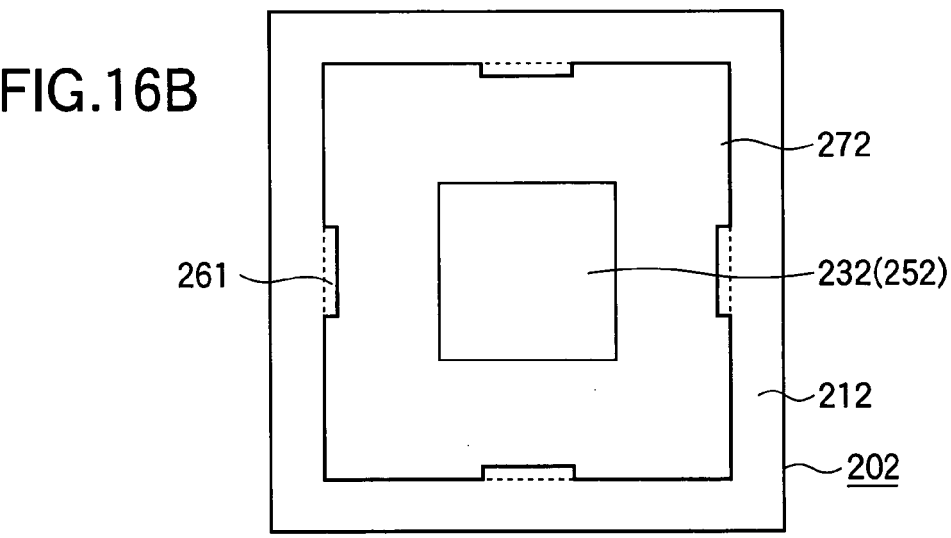
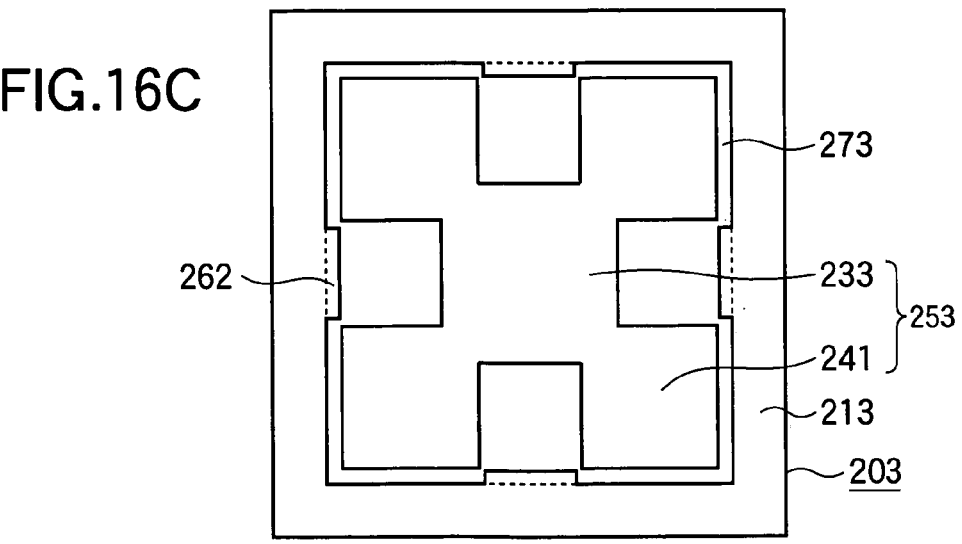

ACCELERATION SENSOR

BACKGROUND OF THE INVENTION

This invention relates to an acceleration sensor, and particularly relates to a technology that enables the adjustment of the sensitivity of the acceleration sensor (made by microfabrication) to be easily performed, and enables the determination whether the acceleration sensor is defective or non-defective to be easily performed.

Generally, a three-dimensional acceleration sensor includes a supporting part for fixing the acceleration sensor to an external board or the like, a weight part, and a deformable beam part that connects the supporting part and the weight part. The conventional three-dimensional acceleration sensor is composed of a laminated structural body. One type of the laminated structural body is made by laminating a plurality of layers on which the supporting part, the weight part and the beam part or the like are formed. The other type of the laminated structural body is made by microfabrication to form the weight part or the like on a laminated board such as SOI (Silicon On Insulator) having been previously laminated.

The present invention relates to the three-dimensional acceleration sensor made by microfabrication on the laminated board.

The three-dimensional acceleration sensor is manufactured by the following process. First, a laminated board including three layers is prepared. The three layers are referred to as first, second and third layers in order beginning at the uppermost layer. Piezoresistive elements are formed on portions of the first layer of the laminated board corresponding to the beam parts. The patterning is performed on the first layer (i.e., the top side of the laminated board), and then the patterning is performed on the third layer (i.e., the bottom side of the laminated board). The acceleration sensor manufactured by such a process is disclosed in, for example, Japanese Laid-Open Patent Publication No. 2004-198243. The publication also discloses the structure and the manufacturing process of an acceleration sensor having a stopper for enhancing the impact resistance and a reinforcing member provided on the stopper.

However, in order to adjust the sensitivity of the conventional acceleration sensor, it is necessary to change the length of the beam part by changing the positions of the supporting part and the weight part. Thus, it is necessary to change the positions of the through holes formed on the top side and the bottom side of the laminated board, and therefore it is necessary to change the layouts on the top side and the bottom side of the laminated board. Accordingly, it is not easy to adjust the sensitivity of the acceleration sensor.

Moreover, in the conventional acceleration sensor, it is difficult to align the through holes formed on the top side and the bottom side of the laminated board with each other. Therefore, it is necessary to pick up several acceleration sensors as samples and to destruct each sample to thereby observe the cross section of each sample using SEM, TEM or the like. Therefore, it is difficult to align the through holes formed on the top side and the bottom side of the acceleration sensor, without destructing the acceleration sensor.

SUMMARY OF THE INVENTION

An object of the present invention is to provide an acceleration sensor that enables the adjustment of the sensitivity of the acceleration sensor (made by microfabrication) to be easily performed, and enables the determination whether the acceleration sensor is defective or non-defective to be easily performed.

According to the invention, there is provided a semiconductor acceleration sensor including a supporting part, a beam part connected to the supporting part, a weight part connected to the beam part, and a protruding part provided beneath the beam part so that the protruding part supports the beam part.

In the above described arrangement, a portion of the beam part contacting the protruding part is prevented from being deformed, and therefore the length of a deformable portion of the beam part is adjusted by adjusting an amount at which the protruding part contacts the beam part. Thus, it is not necessary to change the length of the beam part, and therefore it is not necessary to change the layout of the surface of the acceleration sensor. As a result, the sensitivity of the acceleration sensor can be easily adjusted.

BRIEF DESCRIPTION OF THE DRAWINGS

In the attached drawings:

FIGS. 16A, 16B and 16C are plan views of the layers of the acceleration sensor according to the second embodiment;

DETAILED DESCRIPTION OF THE PREFERRED EMBODIMENT

Embodiments of the present invention will be described with reference to the attached drawings. In the description, the term "vertical" is used to mean a direction perpendicular to laminating surfaces when a plurality of layers are laminated. Similarly, the term "parallel" is used to mean a direction parallel to the laminating surfaces when the layers are laminated. In the embodiments of the present invention, the acceleration sensor and the manufacturing method thereof may use a conventional material (such as a silicon board) and a conventional process (such as an etching process), and in such a case, the detailed description thereof will be omitted.

First Embodiment

Structure

The structure of the acceleration sensor according to the first embodiment of the present invention will be described with reference to FIGS. 1 through 8.

Figure 1:
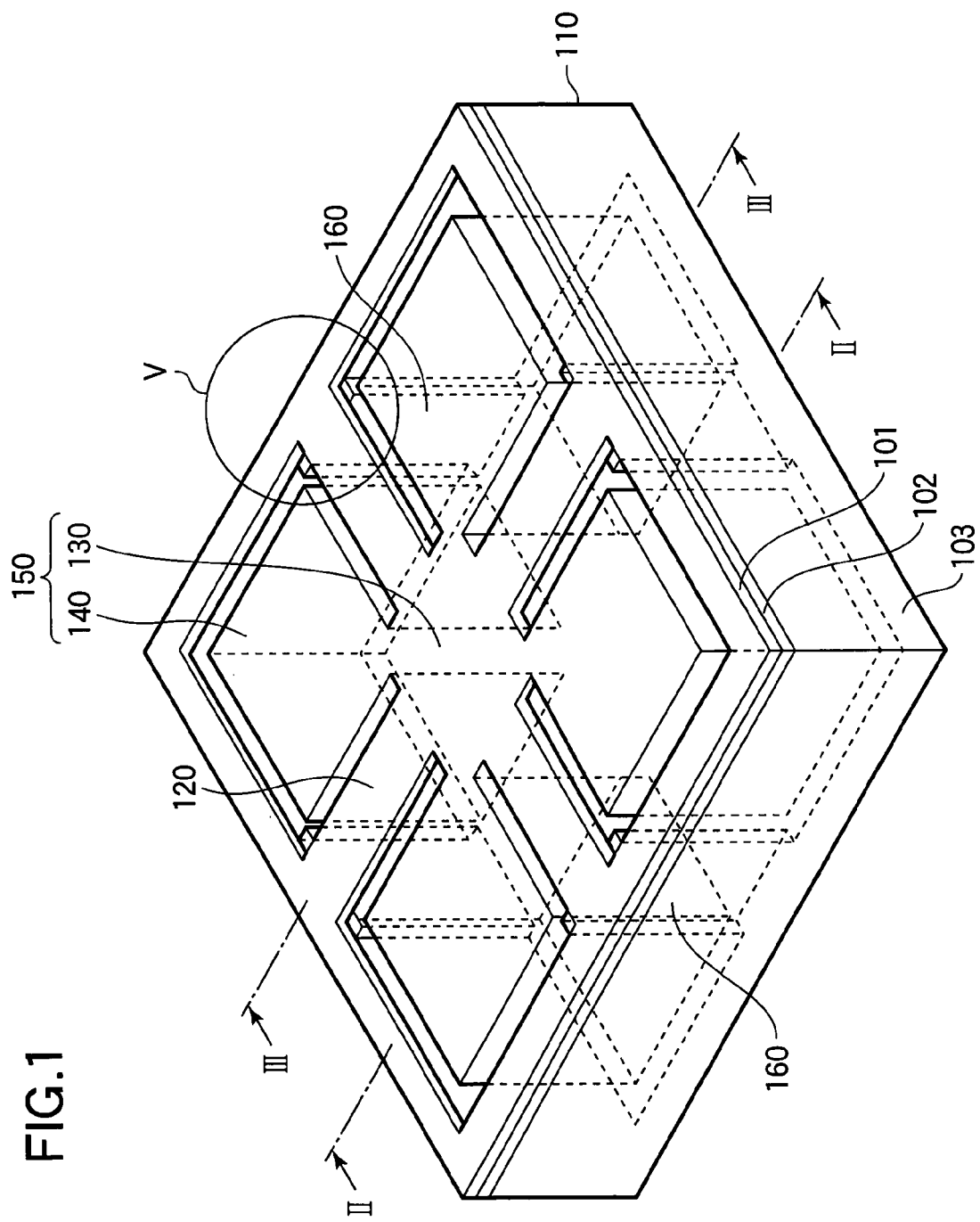
FIG. 1 is a perspective view of an acceleration sensor according to the first embodiment of the present invention.
Figure 2:
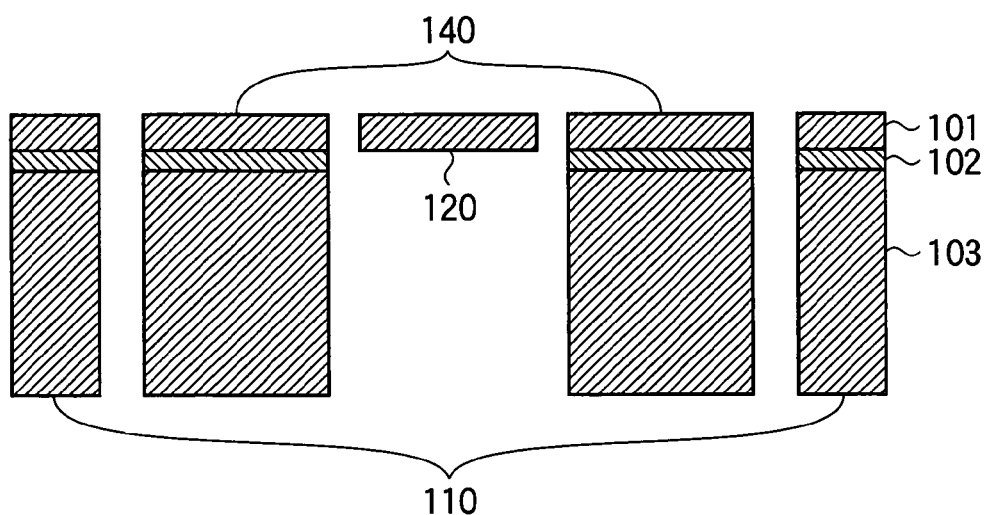
FIG. 2 is a sectional view of the acceleration sensor taken along line II-II shown in FIG. 1.
Figure 3:
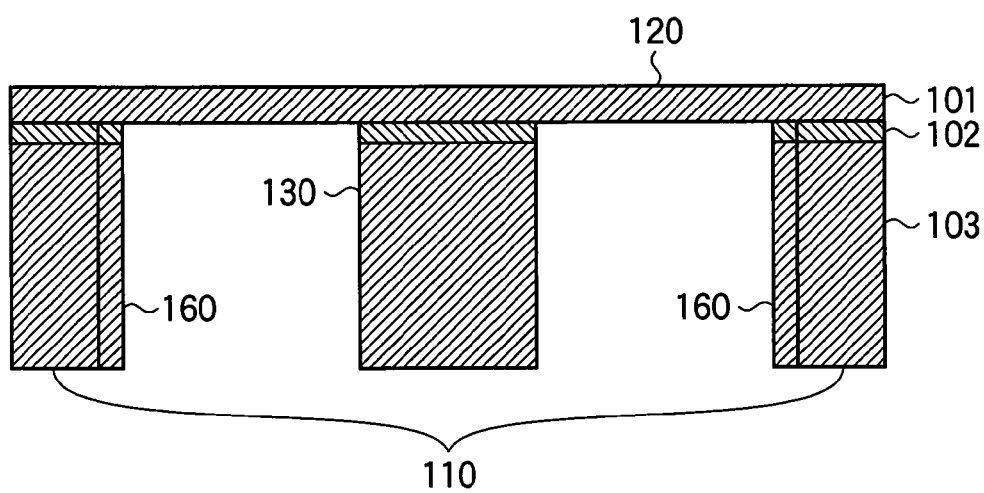
FIG. 3 is a sectional view of the acceleration sensor taken along line III-III shown in FIG. 1.
Figure 4:
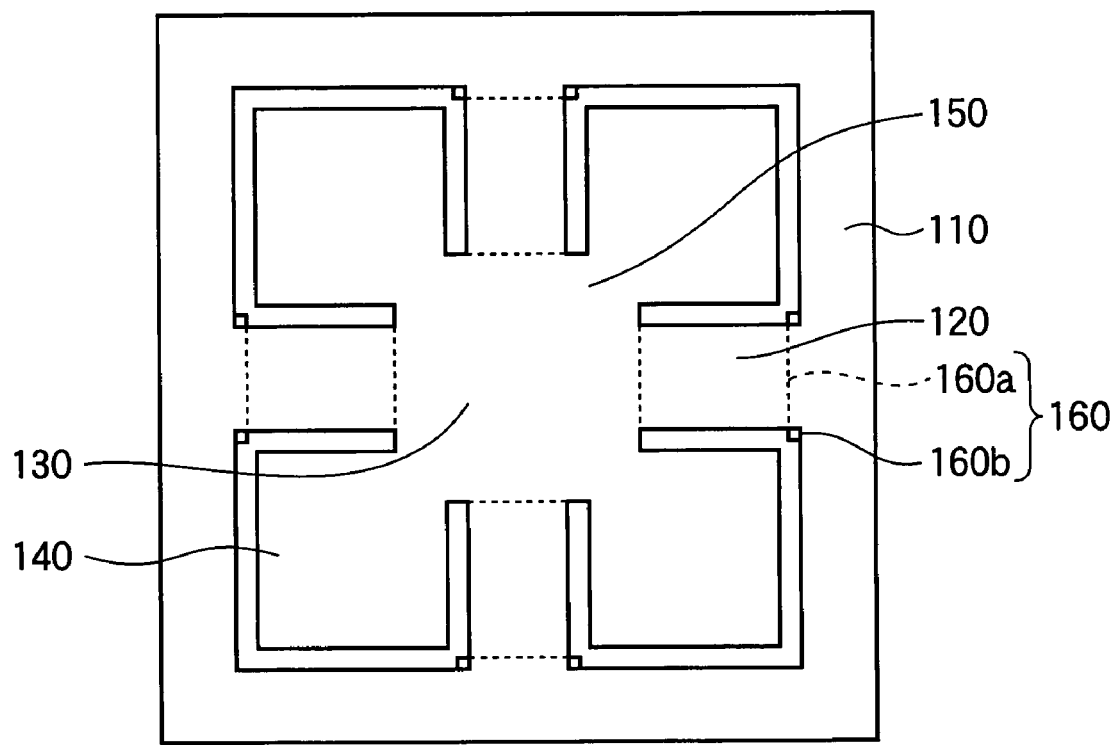
FIG. 4 is a top view of the acceleration sensor according to the first embodiment of the present invention.
Figure 5A:
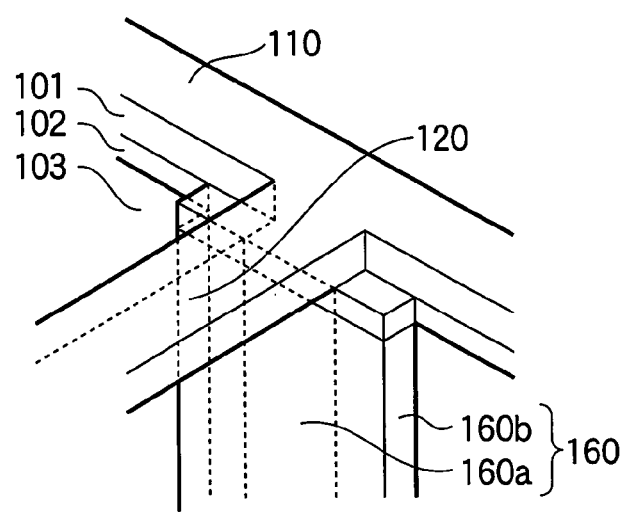
FIG. 5A is an enlarged view of a part of the acceleration sensor indicated by a mark V shown in FIG. 1.
Figure 6:
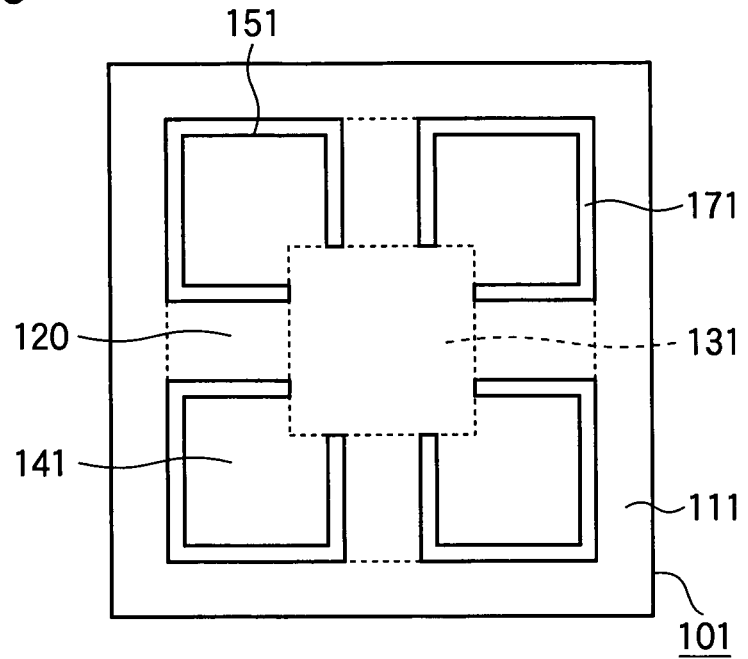
FIG. 6 is a plan view of a first layer of the acceleration sensor according to the first embodiment of the present invention.
Figure 7:
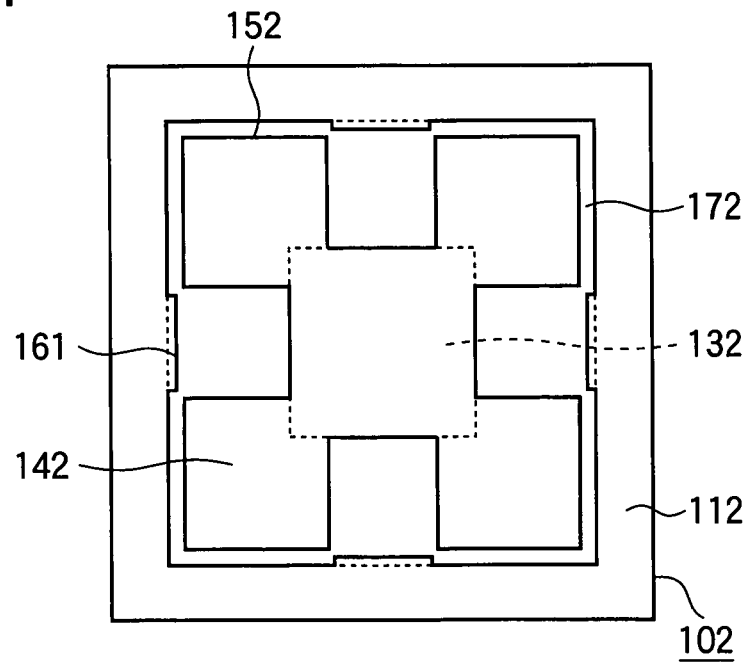
FIG. 7 is a plan view of a second layer of the acceleration sensor according to the first embodiment of the present invention.
Figure 8:
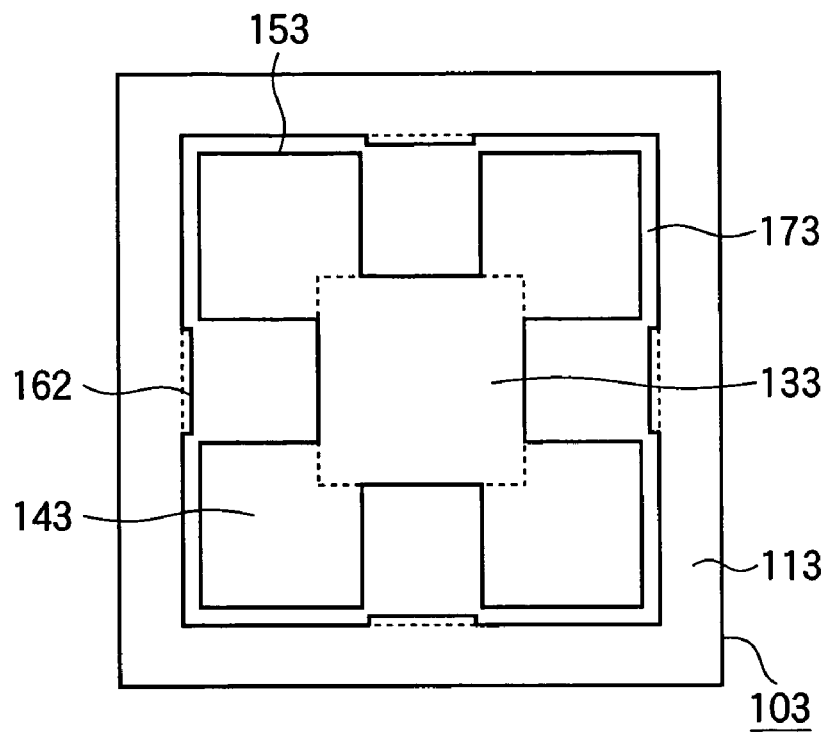
FIG. 8 is a plan view of a third layer of the acceleration sensor according to the first embodiment of the present invention.
Figure 9:
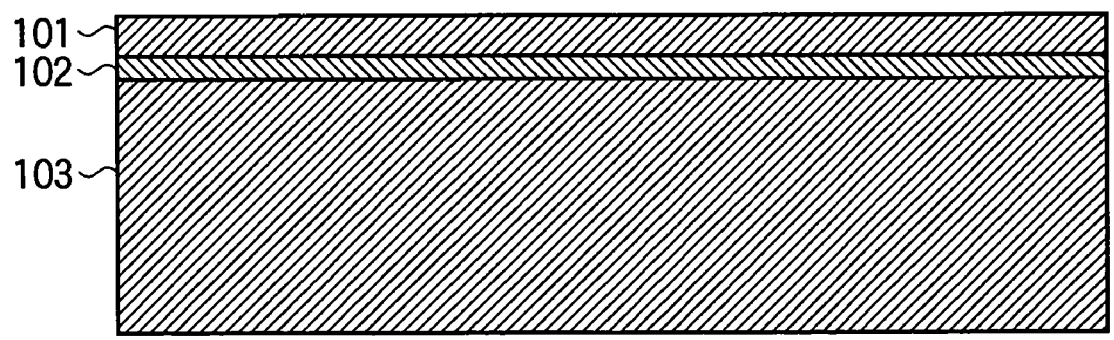
FIG. 9 illustrates a manufacturing process of the acceleration sensor according to the first embodiment of the present invention.

FIG. 1 is a perspective view of the acceleration sensor according to the first embodiment of the present invention. FIG. 2 is a sectional view of the acceleration sensor according to the first embodiment taken along line II-II of FIG. 1. FIG. 3 is a sectional view of the acceleration sensor according to the first embodiment taken along line III-III of FIG. 1. FIG. 4 is a plan view of the acceleration sensor according to the first embodiment shown in FIG. 1. FIG. 5A is an enlarged perspective view of a portion indicated by a mark V shown in FIG. 1. FIG. 6 is a plan view of a first layer 101 (i.e., the uppermost layer) of the acceleration sensor according to the first embodiment of the present invention. FIG. 7 is a plan view of a second layer 102 formed beneath the first layer 101 of the acceleration sensor according to the first embodiment of the present invention. FIG. 8 is a plan view of a third layer 103 formed beneath the second layer 102 of the acceleration sensor according to the first embodiment of the present invention.

As shown in FIG. 1, the acceleration sensor according to the first embodiment is composed of a laminated board including a first layer 101, a second layer 102 and a third layer 103. The first layer 101, the second layer 102 and the third layer 103 are laminated in order beginning at the uppermost layer in such a manner that the respective upper surfaces are directed in the same direction. The acceleration sensor according to the first embodiment includes a supporting part 110, beam parts 120, a weight part 150 and protruding parts 160. The weight part 150 includes a weight connecting portion 130 and supplemental weight portions 140.

The supporting part 110 is composed of a laminated board having rectangular top and bottom surfaces. Through holes are formed on the supporting part 110 and penetrate the supporting part 110 between the top and bottom surfaces. In other words, the supporting part 110 has internal walls that define the through holes. The first layer 101 (i.e., the uppermost layer) of the supporting part 110 is connected to first ends of the beam parts 120. The protruding parts 160 are formed of the second layer 102 (i.e., a layer beneath the uppermost layer) and the third layer 103 (i.e., the lowermost layer).

Each beam part 120 has an elongated shape, and has a first end connected to the internal wall of the supporting part 110 and a second end connected to the weight connecting portion 130 of the weight part 150. A not shown piezoresistive element is formed on each beam part 120. The piezoresistive element detects the deformation of the beam part 120 when the acceleration is applied to the acceleration sensor.

The weight part 150 includes the weight connecting portion 130 and the supplemental weight portions 140. The weight connecting portion 130 is disposed on the center of the weight part 150, and includes portions to which the second ends of the beam parts 120 are connected. The supplemental weight portions 140 are disposed around the weight connecting portion 130. The supplemental weight portions 140 are formed besides the beam parts 120 so that the supplemental weight portions 140 are apart from the beam parts 120. The supplemental weight portions 140 protrude from the weight connecting portion 130 toward the supporting part 110. The distance between the weight connecting portion 130 and the supporting part 110 is set as long as possible for increasing the distance between the first and second ends of each beam part 120 (i.e., the length of each beam part 120). In order to increase the mass of the weight part 150, the supplemental weight portions 140 protrude toward the supporting part 110 as much as possible in spaces surrounded by the supporting part 110, the beam parts 102 and the weight connecting portion 130. Although the weight connecting portion 130 and the supplemental weight portions 140 are separately explained, the weight connecting portion 130 and the supplemental weight portions 140 are integrally formed and constitute the weight part 150 in the first embodiment of the present invention. Alternatively, it is also possible to form the weight part 150 by forming the weight connecting portion 130 and then connecting the supplemental weight portions 140 to the weight connecting portion 130.

Each protruding part 160 is formed on the internal wall of the supporting part 110 and is disposed beneath the beam part 120 so that the protruding part 160 supports the beam part 120. The length of the protruding part 160 is defined as a dimension in the longitudinal direction of the beam part 120. The width of the protruding part 160 is defined as a dimension in the direction of the width of the beam part 120. By the provision of the protruding parts 160, the length of the deformable portion of each beam part 120 decreases by a length at which the protruding part 160 contacts the beam part 120. Thus, the length of the deformable portion of each beam part 120 can be adjusted by adjusting the length at which the protruding part 160 contacts the beam part 120. As a result, the sensitivity of the acceleration sensor can be easily adjusted. Additionally, the protruding parts 160 receive the stress as well as the four corners of the supporting part 110, and therefore portions capable of receiving the stress increase, with the result that the strength of a stationary part of the acceleration sensor can be enhanced.

FIG. 2 is a sectional view of the acceleration sensor taken along line II-II shown in FIG. 1. In the cross section taken along line II-II, the supporting part 110, the beam parts 120 and the supplemental weight portions 140 are shown.

FIG. 3 is a sectional view of the acceleration sensor taken along line III-III shown in FIG. 1. In the cross section taken along line III-III, the supporting part 110, the beam parts 120, the weight connecting portion 130, the supplemental weight portions 140 and the protruding parts 160 are shown. In FIG. 3, it is understood that the length of the deformable portion of each beam part 120 decreases by a length at which the protruding part 160 contacts the beam part 120, with the result that the sensitivity of the acceleration sensor can be easily adjusted.

FIG. 4 is a plan view of the acceleration sensor shown in FIG. 1. As shown in FIG. 4, the width of the protruding part 160 is wider than the width of the beam part 120. Even when the width of the protruding part 160 is wider than the width of the beam part 120, it is possible to obtain the same advantage in enabling the adjustment of the sensitivity and enhancing the strength of the acceleration sensor.

Figure 5B:
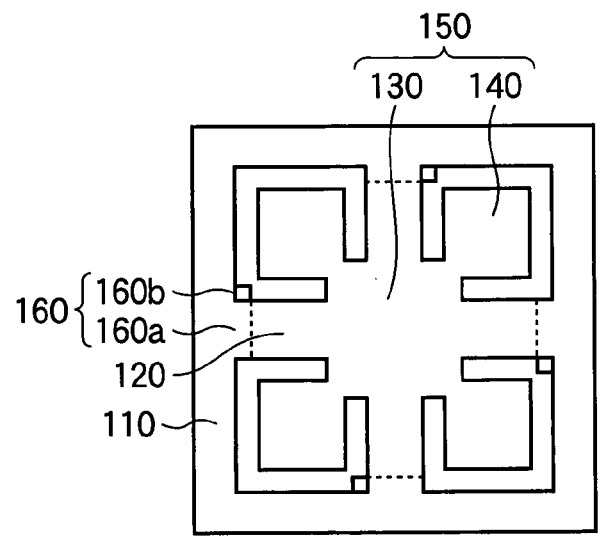
FIGS. 5B and 5C are plan views showing examples of the protruding part of the acceleration sensor according to the first embodiment of the present invention.
Figure 5C:
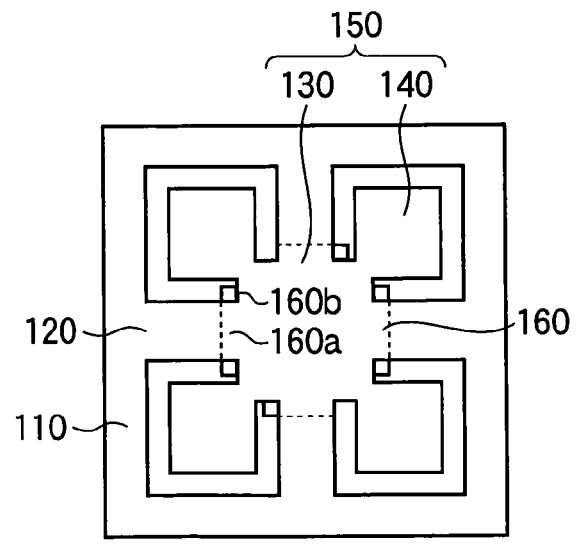

FIG. 5A is an enlarged view of a part of the acceleration sensor according to the first embodiment indicated by a mark III in FIG. 1. FIGS. 5B and 5C show the examples of the protruding parts 160 of the first embodiment of the present invention. The position of the protruding part 160 will be described with reference to FIG. 5A. As shown in FIG. 5A, each protruding part 160 includes a first protruding portion 160a on which the beam part 120 is formed and which supports the beam part 120, and a second protruding portion 160b adjacent to the first protruding portion 160a on which the beam part 120 is not formed.

As shown in FIG. 5A, the beam parts 120 are connected to the first layer 101 (i.e., the uppermost layer) of the supporting part 110 composed of the laminated board. The protruding parts 160 are formed of the second layer 120 (i.e., the layer formed beneath the uppermost layer) and the third layer 130 (i.e., the lowermost layer), and are disposed on the lower side the beam parts 120.

Although the second protruding portions 160b are formed on both sides of the first protruding portion 160a in FIG. 5A, it is also possible that only one second protruding portion 160b is formed on one side of each first protruding portion 160a. By adjusting the length of the first protruding portion 160a, the sensitivity of the acceleration sensor can by easily adjusted. Moreover, in addition to the advantage in enabling the adjustment of the sensitivity, it becomes easy to determine whether the manufactured acceleration sensor is defective or non-defective. The determination can be carried out by, for example, comparing the width of the second protruding portion 160b with the predetermined width of the second protruding portion 160b.

Moreover, in order to enable the determination whether the acceleration sensor is defective or non-defective to be easily performed, it is possible to arrange the protruding parts 160 as shown in FIGS. 5B and 5C.

In the arrangement shown in FIG. 5B, each protruding part 160 is connected to the supporting part 110, and includes a first protruding portion 160a and a second protruding portion 160b formed on one side of the first protruding portion 160a. It is possible to determine whether the acceleration sensor is defective or non-defective, by comparing the width of the second protruding portion 160b with the predetermined width of the second protruding portion 160b to thereby determine the alignment error. It is also possible to determine whether the acceleration sensor is defective or non-defective, by comparing the length of the second protruding portion 160b with the predetermined length of the second protruding portion 160b to thereby determine the alignment error. Moreover, it is also possible to determine whether the acceleration sensor is defective or non-defective, by comparing the widths of the opposing second protruding portions 160b of the plurality of protruding parts 160 with each other, without the comparison with the predetermined width of the second protruding portion 160b.

In the arrangement shown in FIG. 5C, each protruding part 160 is connected to the weight connecting portion 130 of the weight part 150, and includes a first protruding portion 160a and a second protruding portion 160b adjacent to the first protruding portion 160a. With such an arrangement, it is possible to obtain the same advantage as in the case where the protruding parts 160 are connected to the supporting part 110. In particular, it is also possible that each protruding part 160 (connected to the weight part 150) has one second protruding portion 160b formed on one side of the first protruding portion 160a. In such a case, it is possible to obtain the same advantage as in the case where each protruding part 160 (connected to the supporting part 110) has one second protruding portion 160b formed on one side of the first protruding portion 160a as shown in FIG. 5B. Furthermore, it is also possible to provide at least one protruding part 160 (connected to the supporting part 110 or the weight part 150) each having two second protruding portions 160b formed on both sides of the first protruding portion 160a, and at lease one protruding part 160 (connected to the supporting part 110 or the weight part 150) each having one second protruding portion 160b formed on one side of the first protruding portion 160a.

The respective layers of the laminated board of the acceleration sensor according to the first embodiment will be described with reference to FIGS. 6 through 8.

FIG. 6 is a plan view of the first layer (the uppermost layer) 101 of the acceleration sensor according to the first embodiment of the present invention. The first layer 101 includes a first supporting part 111, the beam parts 120 and a first weight part 151. The first weight part 151 includes a first weight connecting portion 131 and first supplemental weight portions 141 connected to the first weight connecting portion 131. The first supporting part 111, the beam parts 120, first weight connecting portion 131 and the first supplemental weight portion 141 are formed by forming first through holes 171 on the first layer 101. Thus, there appears no boarder defining the above described components formed on the first layer 101. Each component is defined according to the function and effect thereof for convenience of description. The first layer 101 has the thickness from 4 μm to 8 μm and is made of silicon. The first layer 101 can be made of other material such as compound semiconductive material that enables the resistive element to be formed on the beam part 120.

FIG. 7 is a plan view of the second layer 102 formed beneath the first layer 101 of the acceleration sensor according to the first embodiment of the present invention. The second layer 102 includes a second supporting part 112 corresponding to the first supporting part 111, first protruding parts 161 formed beneath the beam parts 120 and connected to the second supporting part 112, and a second weight part 152. The second weight part 152 includes a second weight connecting portion 132 and second supplemental weight portions 142 respectively corresponding to the first weight connecting portion 131 and the first supplemental weight portions 141. The second supporting part 112, the first protruding parts 161, the second weight connecting portion 132 and the second supplemental weight portions 142 are formed by forming second through holes 172 on the second layer 102. The second layer 102 has the thickness from 2 μm to 3 μm and is made of silicon oxide film.

FIG. 8 is a plan view of the third layer 103 (the lowermost layer) of the acceleration sensor of the first embodiment of the present invention. The third layer 103 includes a third supporting part 113 corresponding to the second supporting part 112, second protruding parts 162 corresponding to the first protruding parts 161, and a third weight part 153. The third weight part 153 includes a third weight connecting portion 133 and third supplemental weight portions 143 respectively corresponding to the second weight connecting portion 132 and the second supplemental weight portions 142. The third supporting part 113, the second protruding parts 162, the third weight connecting portions 133 and the third supplemental weight portions 143 are formed by forming third through holes 173 on the third layer 103. The third layer 103 has the thickness from 250 μm to 400 μm and is made of silicon.

The acceleration sensor of the first embodiment of the present invention has a laminated structure including the first layer 101 (FIG. 6), the second layer 102 (FIG. 7) and the third layer 103 (FIG. 8). The supporting part 110 is made of the first supporting part 111 formed of the first layer 101, the second supporting part 112 formed of the second layer 102 and the third supporting part 113 formed of the third layer 103. The protruding parts 160 are made of the first protruding parts 161 formed of the second layer 102 and the second protruding parts 162 formed of the third layer 103. The weight connecting portion 130 is made of the first weight connecting portion 131 formed of the first layer 101, the second weight connecting portion 132 formed of the second layer 102 and the third weight connecting portion 133 formed of the third layer 103.

The supplemental weight portions 140 are made of the first supplemental weight portions 141 formed of the first layer 101, the second supplemental weight portions 142 formed of the second layer 102 and the third supplemental weight portions 143 formed of the third layer 103.

According to the acceleration sensor of the first embodiment of the present invention, since the protruding parts 160 are formed beneath the beam part 120, there is an advantage that the sensitivity of the acceleration sensor can be adjusted in a simple manner and at a low cost. Moreover, since the protruding parts 160 have the first protruding parts 161 and the second protruding parts 162 adjacent to the first protruding parts 161, it becomes possible to easily determine whether the acceleration sensor is defective or non-defective based on the positional deviation. Additionally, since the protruding parts 160 are provided on the supporting part 110, it becomes possible to enhance the strength of the acceleration sensor.

Manufacturing Method

The manufacturing method of the acceleration sensor according to the first embodiment of the present invention will be described with reference to FIGS. 1, 9 through 12C.

Figure 10A:
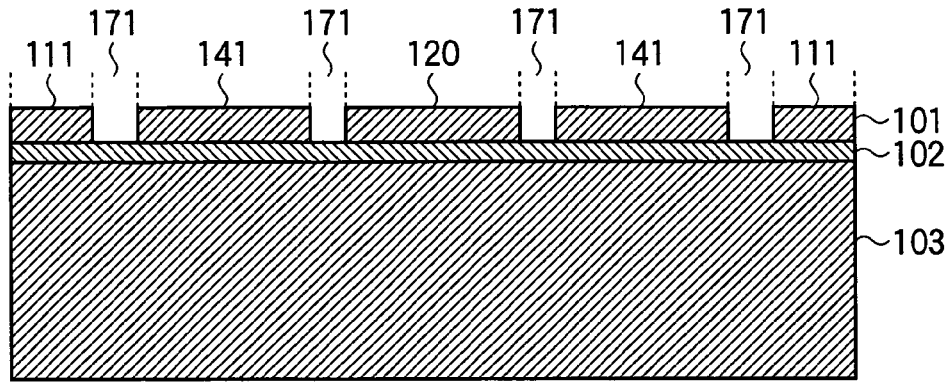
FIGS. 10A and 10B are sectional views showing the manufacturing process of the acceleration sensor taken along lines II-II and III-III shown in FIG. 1.
Figure 10B:
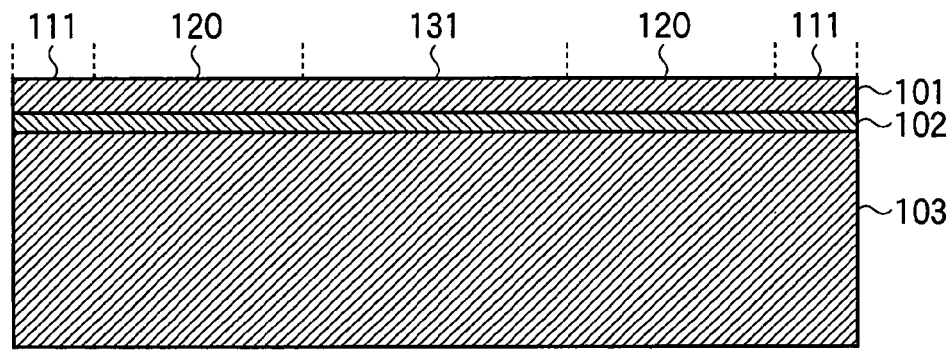
Figure 10C:
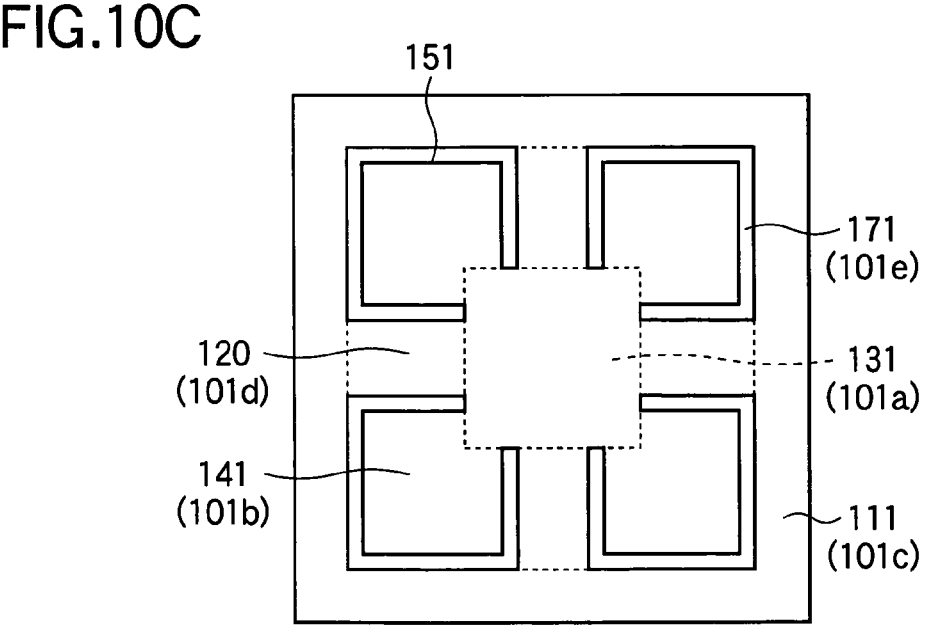
FIG. 10C is a plan view of the first layer of the acceleration sensor according to the first embodiment of the present invention.
Figure 11A:
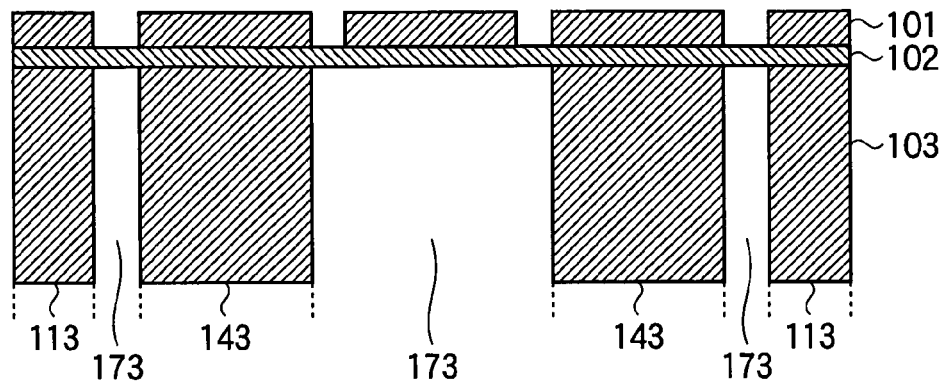
FIGS. 11A and 11B are sectional views showing the manufacturing process of the acceleration sensor taken along lines II-II and III-III shown in FIG. 1.
Figure 11B:
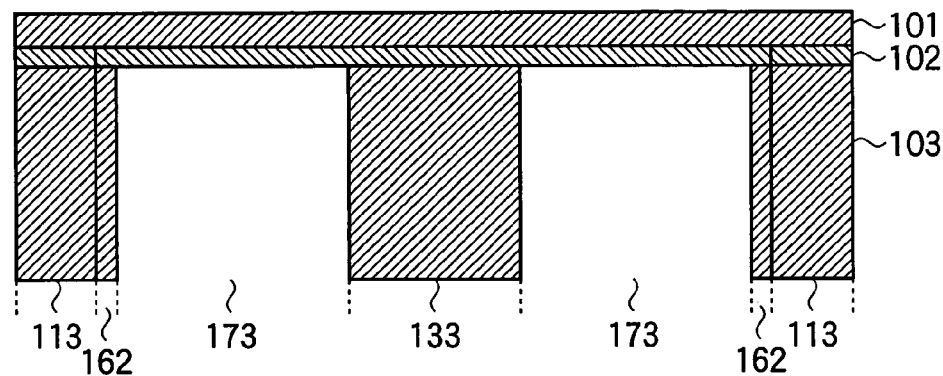
Figure 11C:
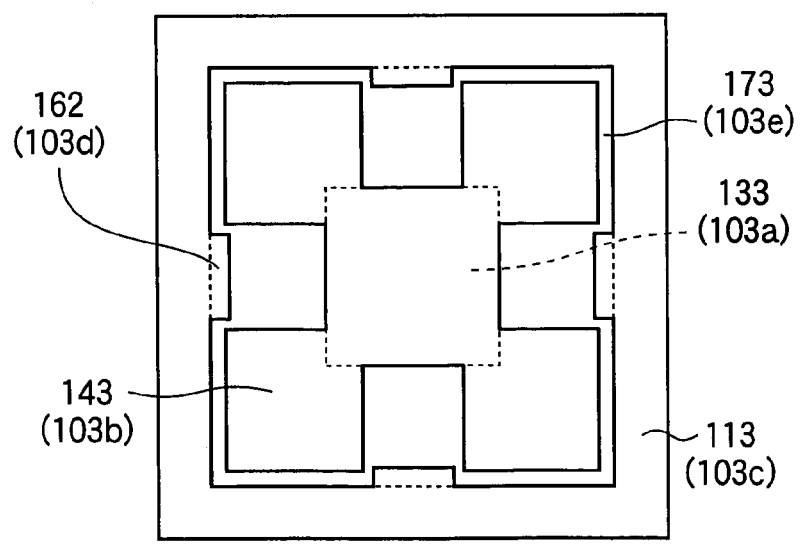
FIG. 11C is a plan view of the second layer of the acceleration sensor according to the first embodiment of the present invention.
Figure 12A:
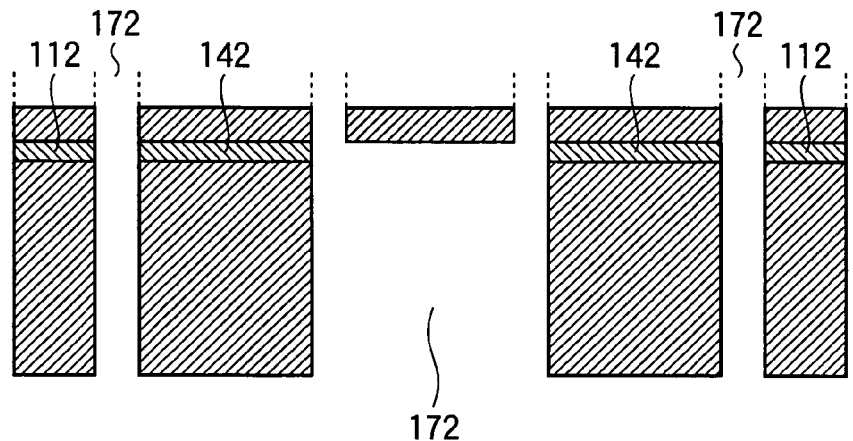
FIGS. 12A and 12B are sectional views showing the manufacturing process of the acceleration sensor taken along lines II-II and III-III shown in FIG. 1.
Figure 12B:
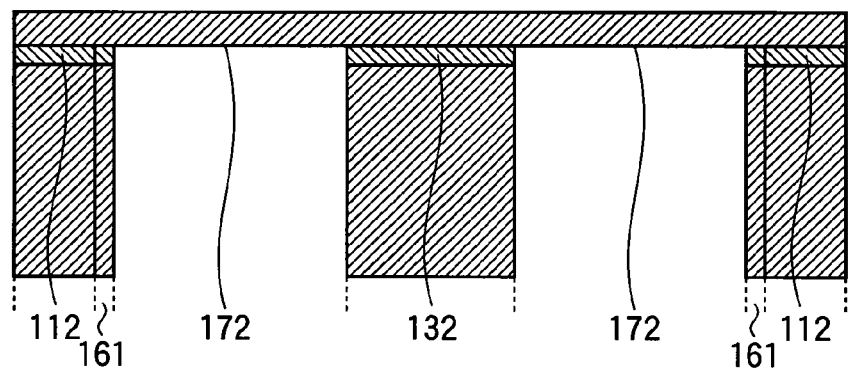
Figure 12C:
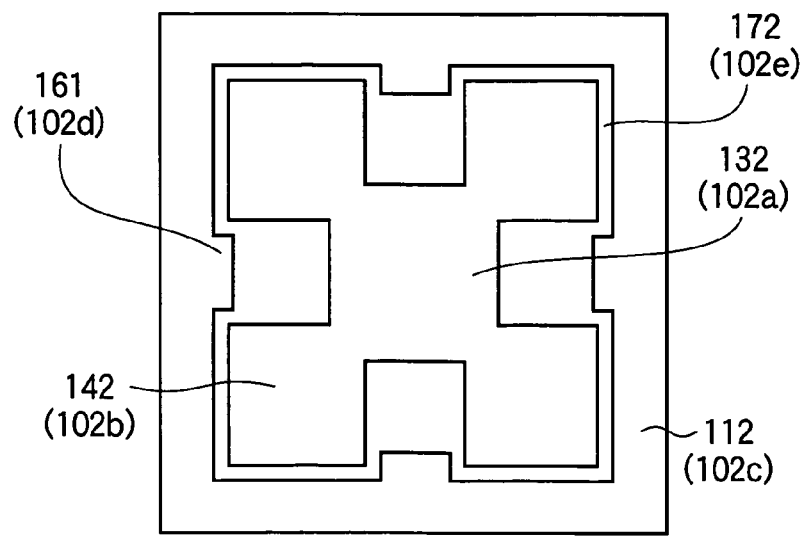
FIG. 12C is a plan view of the third layer of the acceleration sensor according to the first embodiment of the present invention.

In the first embodiment, a laminated board of SOI (Silicon On Insulator) including the first layer 101, the second layer 102 and the third layer 103 is used. Each of the first layer 101, the second layer 102 and the third layer 103 has a top surface and a bottom surface, and the respective top surfaces are directed in the same direction. FIGS. 10A, 11A and 12A show the manufacturing process of the acceleration sensor in a cross section taken along the line II-II in FIG. 1. FIGS. 10B, 11B and 12B show the manufacturing process of the acceleration sensor in a cross section taken along the line III-III in FIG. 1. FIGS. 10C, 11C and 12C are plan views of the first, second and third layers 101, 102 and 103.

As shown in FIGS. 10A and 10B, the not-shown piezoresistive elements are formed on portions of the first layer 101 which are to become the beam parts 120, by means of the semiconductor circuit forming process. Then, the through holes 171 are formed on the first layer 101. The plan view of the first layer 101 (as seen from above) is as shown in FIG. 10C. As shown in FIG. 10C, the through holes 171 are so formed as to form the first supporting part 111, the beam parts 120, the first weight connecting portion 131 and the first supplemental weight portions 141. The first layer 101 is divided into a first region 101a, four second regions 101b adjacent to the first region 101a, a third region 101c that distantly surrounds the first and second regions 101a and 101b, four fourth regions 101d that connect the first and third regions 101a and 101c (and are disposed between the respective four second regions 101b), and four fifth regions 101e surrounded by the first, second, third and fourth regions 101a, 101b, 101c and 101d. The four first through holes 171 are formed of the four fifth regions 101e of the first layer 101 so that the first weight connecting portion 131 is formed of the first region 101a, the four supplemental weight portions 141 are formed of the four second regions 101b, the first supporting part 111 is formed of the third region 101c, and the four beam parts 120 are formed of the four fourth region 101d.

Then, as shown in FIGS. 11A and 11B, the third through holes 173 are formed on the third layer 103 from the bottom side of the laminated board by means of the semiconductor circuit forming process. The plan view of the third layer 103 (as seen from above) is as shown in FIG. 11C. The third through holes 173 are so formed as to form the third supporting part 113, the third weight connecting portion 133, the third supplemental weight portions 143 and the second protruding parts 162. The third layer 103 is divided into a sixth region 103a corresponding to the first weight connecting portion 131 of the first layer 101, four seventh regions 103b corresponding to the first supplemental weight portion 141 of the first layer (and adjacent to the sixth region 103a), an eighth region 103c corresponding to the first supporting part 111 of the first layer 101 and distantly surrounding the sixth and seventh regions 103a and 103b, four ninth regions 103d corresponding to at least a part of the beam part 120 of the first layer 101 and adjacent to the eighth region 103c, and a tenth region 103e surrounded by sixth, seventh, eighth and ninth regions 103a, 103b, 103c and 103d. The third through holes 173 are formed of the tenth region 103e of the third layer 103 so that the third weight connecting portion 133 is formed of the sixth region 103a, the four supplemental weight portions 143 are formed of the four seventh regions 103b, the third supporting part 113 is formed of the eighth region 103c, and the four second protruding parts 162 are formed of the four ninth regions 103d.

Next, as shown in FIGS. 12A and 12B, the second through holes 172 are formed on the second layer 102 from the bottom of the laminated board by means of the semiconductor circuit forming process. The plan view of the third layer 102 (as seen from above) is as shown in FIG. 12C. The second layer 102 is divided into an eleventh region 102a corresponding to the first and third weight connecting portions 131 and 133 of the first and third layers 101 and 103, four twelfth regions 102b corresponding to the first and third supplemental weight portions 141 and 143 of the first and third layers 101 and 103 (and adjacent to the eleventh region 102a), a thirteenth region 102c corresponding to the first and third supporting parts 111 and 113 of the first and third layers 101 and 103 and distantly surrounding the eleventh and twelfth regions 102a and 102b, four fourteenth regions 102d corresponding to the second protruding parts 162 of the third layer 103, and a fifteenth region 102e surrounded by eleventh, twelfth, thirteenth and fourteenth regions 102a, 102b, 102c and 102d. The second through holes 172 are formed of the fifteenth regions 102e of the second layer 102 so that the second weight connecting portion 132 is formed of the eleventh region 102a, the four supplemental weight portions 142 are formed of the four twelfth regions 102b, the second supporting part 112 is formed of the thirteenth region 102c, and the four first protruding parts 161 are formed of the four fourteenth region 102d.

After the acceleration sensor is manufactured, the determination whether the acceleration sensor is defective or non-defective is performed. The determination is performed by comparing the dimension (i.e., length or width) or the position of the protruding part 160 with the predetermined dimension or the predetermined position. The determination can also be performed by comparing the dimension (i.e., length or width) or the position of the protruding part 160 with the dimension or the position of the beam part 120.

In the third layer 103 (FIG. 11C), the width of the third through hole 173 between the third weight connecting portion 133 and the third supporting part 113 is wider than the width of the third through hole 173 between the third supplemental weight portions 143 and the third supporting part 113. Therefore, if the difference of the width of the third through holes 173 is large, an insufficient etching or excessive etching may locally occur because of the difference of the width of the third through holes 173, and therefore there is a possibility that the third through holes 173 may not be formed or that the width of the third through holes 173 may not be well controlled.

However, according to the acceleration sensor of the first embodiment of the present invention, since the second protruding parts 162 are provided, the difference of the width of the third through holes 173 is reduced. Therefore, in addition to the advantage of enabling the adjustment of the sensitivity of the acceleration sensor to be easily performed, there is a further advantage that the insufficient etching or excessive etching can be prevented, and therefore the local width of the through holes can be controlled.

As described with reference to FIGS. 1, 9 through 12C, the manufacturing method according to the first embodiment of the present invention includes the forming steps of the beam parts 120 (each having the first end and the second end), the supporting part 110 (connected to the first ends of the beam parts 120), the weight parts 150 (including the weight connecting portion 130 connected to the second ends of the beam parts 120 and the supplemental weight portions 140 disposed besides the beam parts 120 and protruding toward the supporting part 110) and the protruding parts 160 that support the beam parts 120. With such a manufacturing method, it is possible to obtain the acceleration sensor enabling the adjustment of the sensitivity to be easily performed.

Further, the inspection method according to the first embodiment of the present invention includes the step of determining whether the acceleration sensor is defective or non-defective based on the dimension (i.e., length or width) or the position of the protruding part 160. With such an inspection method, it becomes possible to easily determine whether the acceleration sensor is defective or non-defective. Alternatively, even when the inspection method includes the step of determining whether the acceleration sensor is defective or non-defective by comparing the dimension (i.e., length or width) or the position of the protruding part 160 with the dimension or the position of the beam parts 120, the same advantage can be obtained.

Second Embodiment

An acceleration sensor according to the second embodiment of the present invention will be described with reference to FIGS. 13 through 17C.

Figure 13:
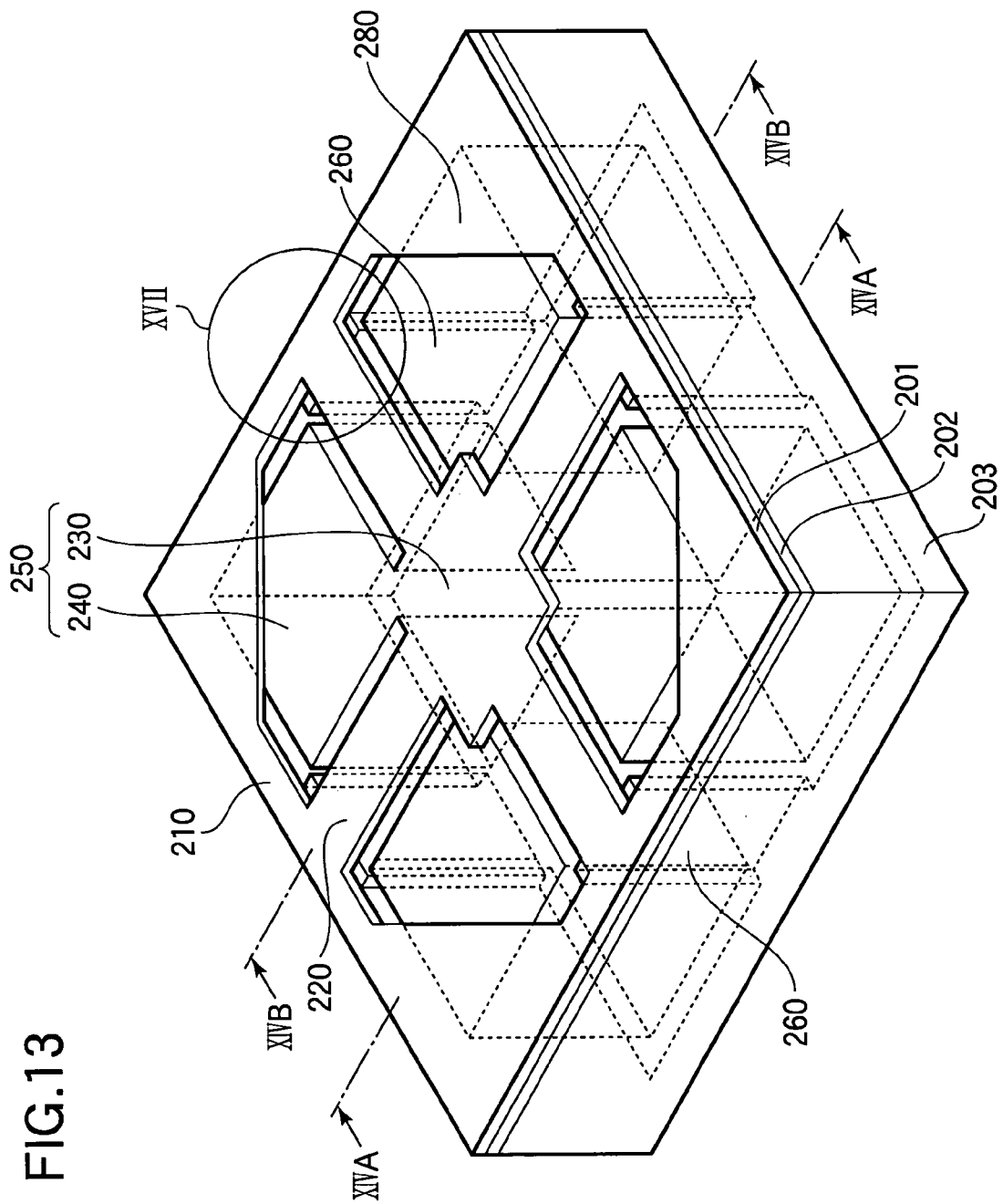
FIG. 13 is a perspective view of an acceleration sensor according to the second embodiment of the present invention.
Figure 14A:
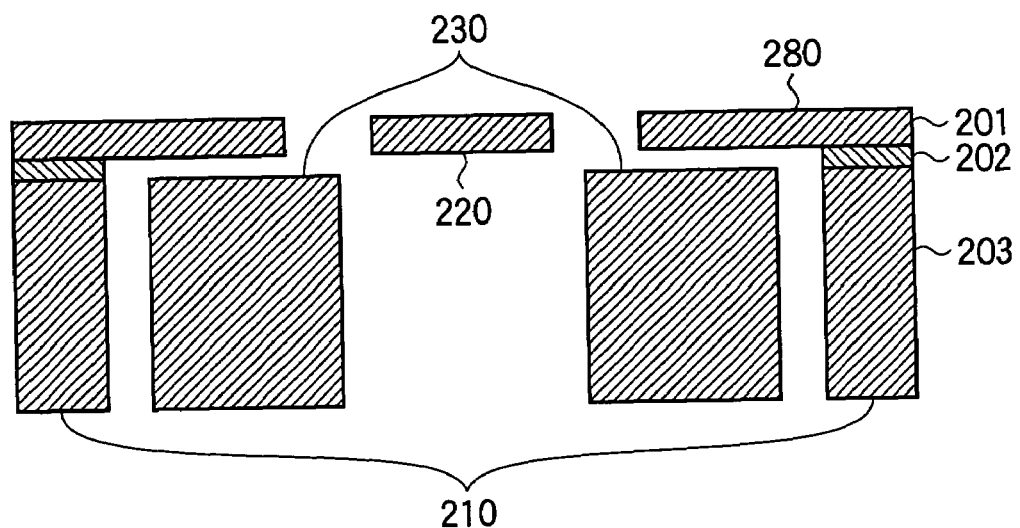
FIGS. 14A and 14B are sectional views of the acceleration sensor taken along line XIVA-XIVA and XIVB-XIVB shown in FIG. 13.
Figure 14B:
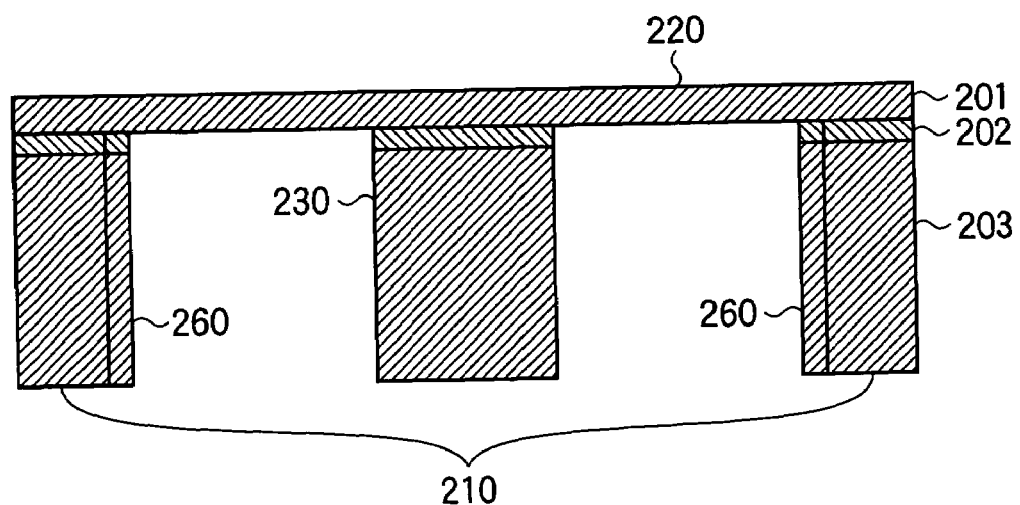
Figure 15:
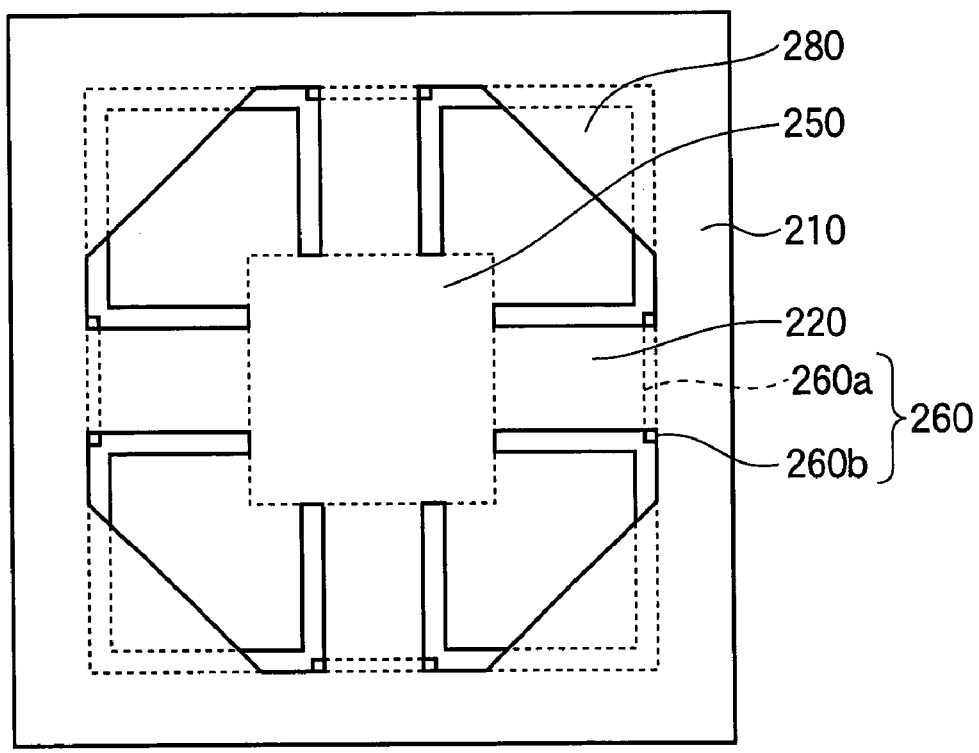
FIG. 15 is a plan view of the acceleration sensor according to the second embodiment of the present invention.
Figure 17A:
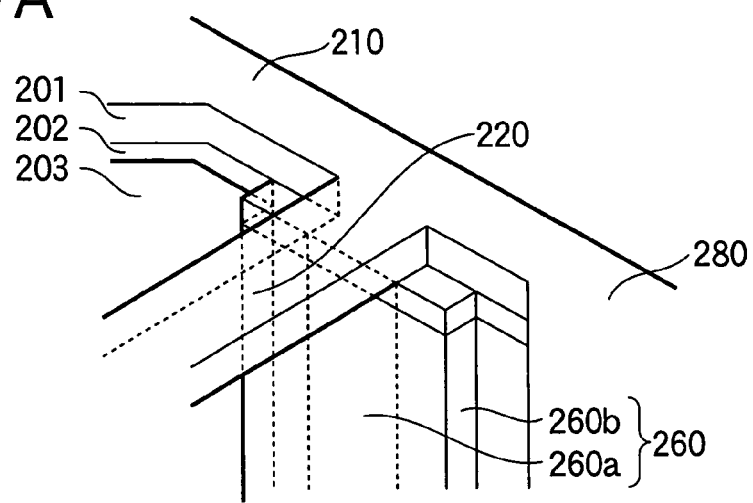
FIG. 17A is an enlarged view of a part of the acceleration sensor indicated by a mark XVII shown in FIG. 13.
Figure 17B:
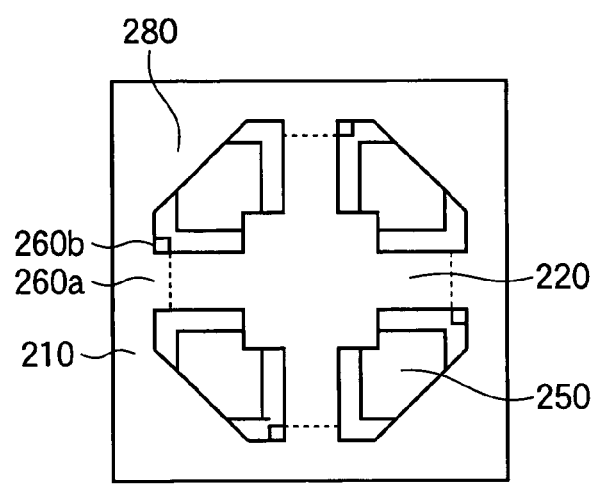
FIGS. 17B and 17C are plan views showing examples of the protruding part of the acceleration sensor according to the first embodiment of the present invention.
Figure 17C:
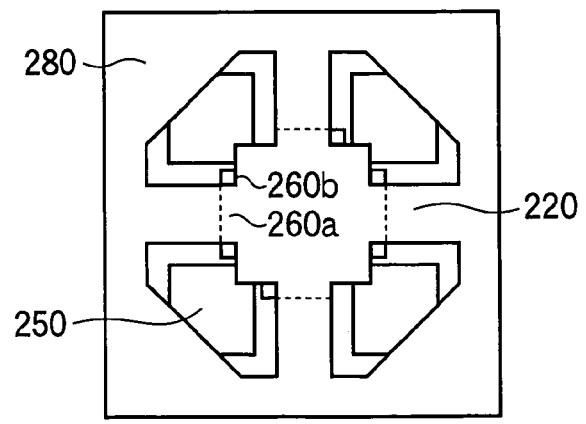

FIG. 13 is a perspective view of the acceleration sensor according to the second embodiment of the present invention. FIGS. 14A and 14B are sectional views of the acceleration sensor according to the second embodiment respectively taken along lines XIVA-XIVA and XIVB-XIVB shown in FIG. 13. FIG. 15 is a plan view of the acceleration sensor according to the second embodiment shown in FIG. 13. FIGS. 16A, 16B and 16C are plan views of layers of the acceleration sensor according to the second embodiment. FIG. 17A is an enlarged view of a part of the acceleration sensor according to the second embodiment indicated by a mark XVII shown in FIG. 13. FIGS. 17B and 17C are plan views showing examples of the positions of the protruding part of the acceleration sensor according to the second embodiment.

Different from the acceleration senor of the above described first embodiment, the acceleration sensor of the second embodiment is provided with stopper parts.

The acceleration sensor according to the second embodiment of the present invention is composed of a laminated board including three layers, i.e., a first layer 201, a second layer 202 and a third layer 203. The first layer 201, the second layer 202 and the third layer 203 are laminated in this order in such a manner that respective top surfaces are directed in the same direction. The acceleration sensor according to the second embodiment includes a supporting part 210, beam parts 220, a weight part 250, protruding parts 260 and stopper parts 280. The weight part 250 includes a weight connecting portion 230 and supplemental weight portions 240. The same components as those in the first embodiment are assigned the same reference numerals, and the detailed description thereof is omitted.

The stopper parts 280 are formed at the top of the supporting part 210 and are disposed above the supplemental weight portions 240 of the weight part 250 so that the stopper parts 280 are apart from the supplemental weight portions 240. Since the stopper parts 280 are provided above the supplemental weight portions 240, the upward movement of the weight part 250 is limited by the stopper parts 260 even when the weight part 250 is going to excessively moves in the vertical direction. Thus, the impact resistance in the vertical direction can be enhanced, compared with the conventional acceleration sensor. Additionally, since the stopper parts 280 are not disposed above the beam parts 220, it is possible to prevent the collision of the weight part 250 with the beam parts 220 and to thereby prevent the damage of the beam parts 220, even when the weight part 250 moves (and the beam parts 220 are deformed) due to the acceleration.

FIG. 16A is a plan view of the first layer 201 of the acceleration sensor according to the second embodiment. The first layer 201 includes a first supporting part 211, the beam parts 220, a first weight part 251 and the stopper parts 280. The first weight part 251 includes a first weight connecting portion 231 connected to the beam parts 220. The first supporting part 211, the beam parts 220, the first weight connecting portion 231 and the stopper parts 280 are formed by forming first through holes 271 on the first layer 201.

FIG. 16B is a plan view of the second layer 202 formed beneath the first layer 201. The second layer 202 includes a second supporting part 212 corresponding to the first supporting part 211, first protruding parts 261 formed beneath the beam parts 220 and connected to the second supporting part 212, and a second weight part 252. The second weight part 252 includes a second weight connecting portion 232 corresponding to the first weight connecting portion 231. The second supporting part 212, the first protruding parts 261 and the second weight connecting portion 232 are formed by forming second through holes 272 on the second layer 202.

FIG. 16C is a plan view of the third layer 203 formed beneath the second layer 202. The third layer 203 includes a third supporting part 213 corresponding to the second supporting part 212, second protruding parts 262 corresponding to the first protruding parts 261, and a third weight part 253. The third weight part 253 includes a third weight connecting portion 233 (corresponding to the second weight connecting portions 231 and 232) and first supplemental weight portions 241 connected to the third weight connecting portion 233. The third supporting part 213, the second protruding parts 262, the third weight connecting portions 233 and the first supplemental weight portions 241 are formed by forming third through holes 273 on the third layer 203.

In the acceleration sensor of the second embodiment, the stopper parts 280 are formed of the first layer 201 (i.e., the uppermost layer) of the acceleration sensor. Accordingly, the area of the first layer 201 increases by the area at which the stopper parts 280 are formed. Thus, when the acceleration sensor is observed from above for determining the alignment of the through holes (i.e., checking whether the through holes formed on the top side and the bottom side of the acceleration sensor are aligned with each other), the through holes formed on the bottom side of the acceleration sensor may be hidden behind the first layer 201 at which the stopper parts 280 are formed. Therefore, it is difficult to determine the alignment of the through holes, compared with the acceleration sensor having no stopper part.

However, the acceleration sensor of the second embodiment of the present invention has protruding parts 260, and therefore it becomes easy to determine the alignment of the through holes based on the dimension or the position of the protruding parts 260. Thus, there is an advantage that it becomes easy to determine whether the acceleration sensor is defective or non-defective, in addition to the advantage that the sensitivity of the acceleration sensor can be easily adjusted. Furthermore, in a configuration in which the protruding parts 260 are connected to the supporting part 210, the strength of the acceleration sensor can be further enhanced.

The examples of the protruding parts 260 are shown in FIGS. 17B and 17C. The configurations shown in FIGS. 17B and 17C are the same as those shown in FIGS. 5B and 5C, except the provision of the stopper parts 280. With such configurations, the determination whether the acceleration sensor is defective or non-defective can be performed as is the case with the protruding parts 160 shown in FIGS. 5B and 5C.

In the second embodiment, the manufacturing method and the inspection method are the same as those described in the first embodiment.

Figure 18:
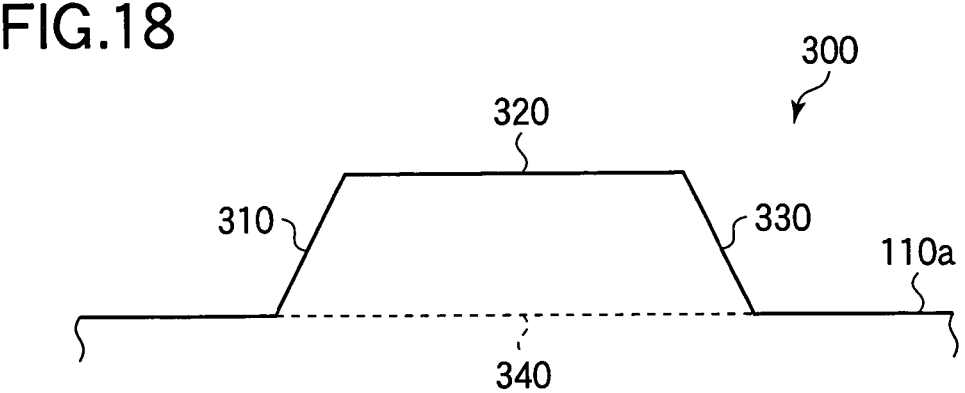
FIG. 18 shows an example of the protruding part of the acceleration sensor according to the embodiments of the present invention.
Figure 19:
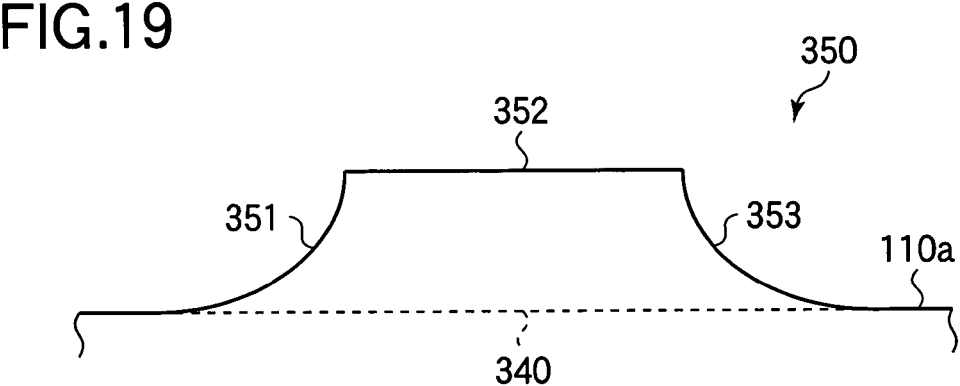
FIG. 19 shows another example of the protruding part of the acceleration sensor according to the embodiments of the present invention.
Figure 20:
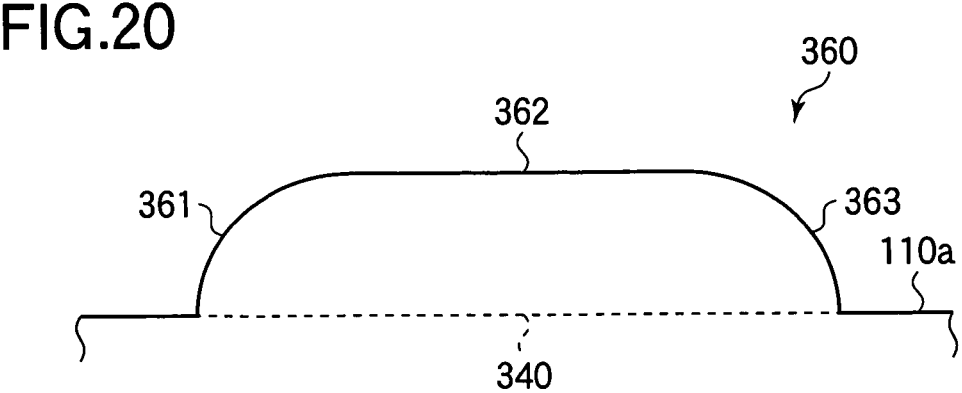
FIG. 20 shows a further example of the protruding part of the acceleration sensor according to the embodiments of the present invention.

FIGS. 18 through 20 are plan views showing examples of the shapes of the protruding parts of the acceleration sensor according to the first and second embodiments of the present invention. The shapes shown in FIGS. 18 through 20 have the following advantages in addition to the advantages described in the first and second embodiments.

The protruding part 300 shown in FIG. 18 has a first surface 310, a second surface 320 and a third surface 330. The first surface 310 and the third surface 330 are connected to the inner surface 110a of the supporting part. 110 so that the second surface 320 projects from the inner surface 110a. The first surface 310 and the third surface 330 are inclined with respect to the inner surface 110a so that the second surface 320 is smaller than a connecting plane 340 that defines a border between the protruding part 300 and the supporting part 110. The angle between the inner surface 110a and each of the first surface 310 and the third surface 330 is an obtuse angle, so that the protruding part 300 is in the shape of a trapezoid as seen from above. When the pressure is applied to the supporting part 110, there is a possibility that the stress is concentrated on corners (i.e., right-angled portions) of the protruding part. However, since the protruding part 300 shown in FIG. 18 has obtuse-angled portions, it is possible to diffuse the stress. Thus, according to the protruding part 300 shown in FIG. 18, there is an advantage that the stress can be prevented from being concentrated on the protruding part 300, in addition to the advantages of the first and second embodiment.

The protruding part 350 shown in FIG. 19 has a first surface 351, a second surface 352 and a third surface 353. The first surface 351 and the third surface 353 are connected to the inner surface 110a of the supporting part 110 so that the second surface 352 projects from the inner surface 110a. The first surface 351 and the third surface 353 are so formed that the second surface 352 is smaller than the connecting plane 340 that defines a border between the protruding part 350 and the supporting part 110. The first surface 351 and the third surface 353 are curved in the form of concaves recessed toward the connecting plane 340. As the protruding part 350 has curved portions, it is possible to diffuse the stress applied to the supporting part 110. Thus, the strength of the acceleration sensor can be further enhanced, compared with the protruding part 300 shown in FIG. 18. Additionally, since the first surface 351 and the third surface 353 are curved in the form of concaves recessed toward the connecting plane 340, the moving amount of the weight part in the horizontal direction (when the acceleration is applied to the acceleration sensor) can be set larger. Moreover, the even when the weight part abuts against the protruding part 350, the stress thereof is diffused at the curved surfaces of the protruding part 350, and therefore it is possible to prevent the damage on the protruding part 350 and the weight part. Thus, a long-term reliability can be enhanced.

The protruding part 360 shown in FIG. 20 has a first surface 361, a second surface 362 and a third surface 363. The first surface 361 and the third surface 362 are connected to the inner surface 110a of the supporting part 110 so that the second surface 362 projects from the inner surface 110a. The first surface 361 and the third surface 363 are so formed that the second surface 362 is smaller than the connecting plane 340. The first surface 361 and the third surface 363 are curved in the form of convexes that project away from the connecting plane 340. Since the protruding part 360 has curved portions, it is possible to diffuse the stress applied to the supporting part 110, as is the case with the acceleration sensor having the protruding parts shown in FIGS. 19. Thus, the strength of the acceleration sensor can be further enhanced. Moreover, the even when the weight part abuts against the protruding part 360, the stress thereof is diffused at the curved surfaces of the protruding part 360, and therefore it is possible to prevent the damage on the protruding part 360 and the weight part. Therefore, a long-term reliability can be enhanced. Additionally, since the first surface 361 and the third surface 363 are curved to project away from the connecting plane 340, the protruding part 360 acts as a stopper to define the moving amount of the weight part in the horizontal direction. Thus, even when the excessive acceleration is applied to the acceleration sensor, the moving amount of the weight part in the horizontal direction can be restricted so as to keep the deformation of the beam part within an allowable deformation.

Regarding the shapes of the protruding part shown in FIGS. 18 through 20, it is possible to employ the optimum shapes according to the required condition or the like.

In the above described embodiments, the number of the beam parts 120 (220) are not limited to four, but can be any of one, two, three or more than four. Similarly, the number of the protruding parts 160 (260) are not limited to four, but can be one, two, three or more than four. Further, the number of the supplemental weight portions 140 (240) is not limited to four, but can be one, two, three or more than four.

COMPARATIVE EXAMPLE

The comparative example with respect to the embodiments of the present invention will be described with reference to FIGS. 21 through 28.

Figure 21:
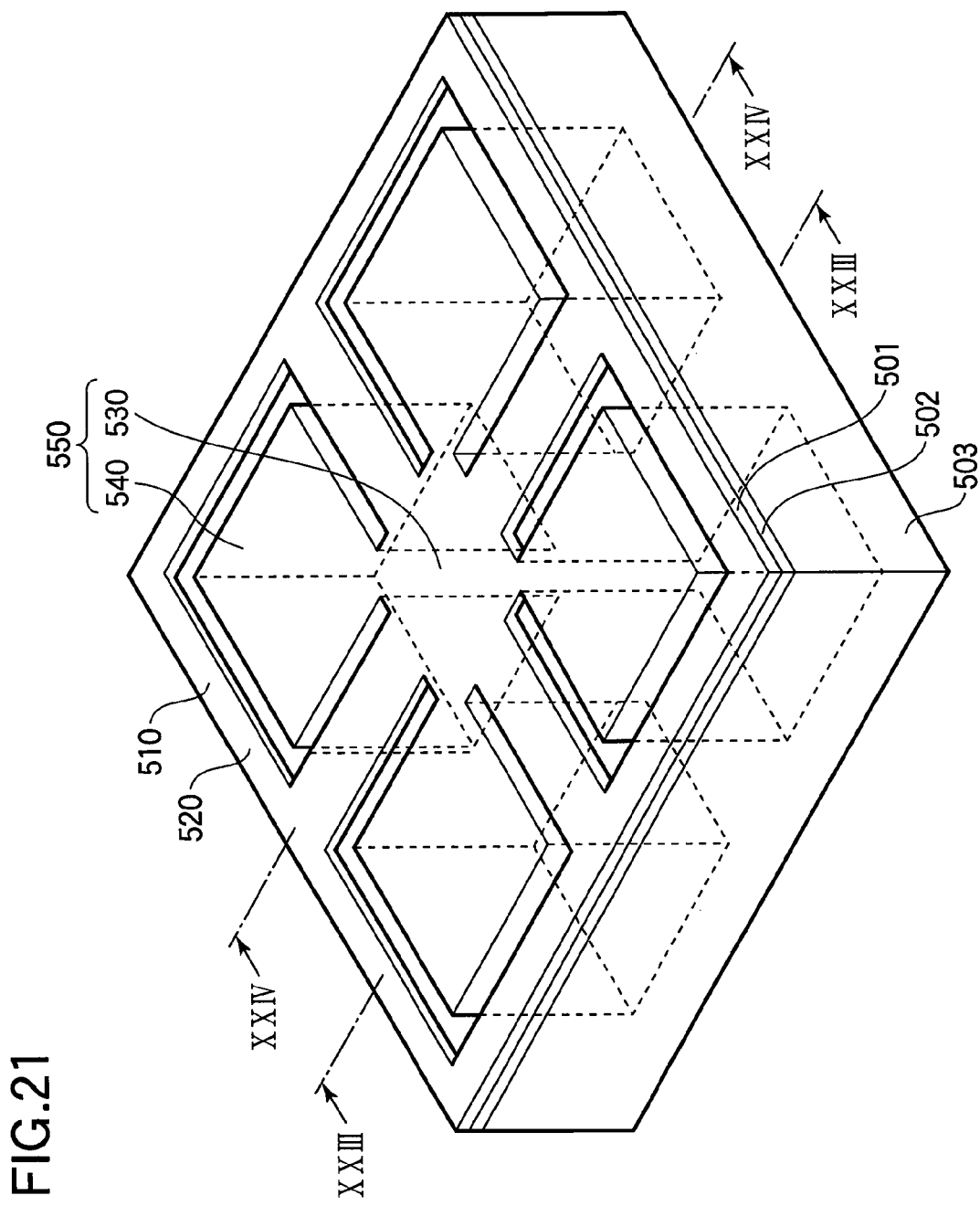
FIG. 21 is a perspective view of the acceleration sensor according to the comparative example with respect to the embodiments of the present invention.
Figure 22:
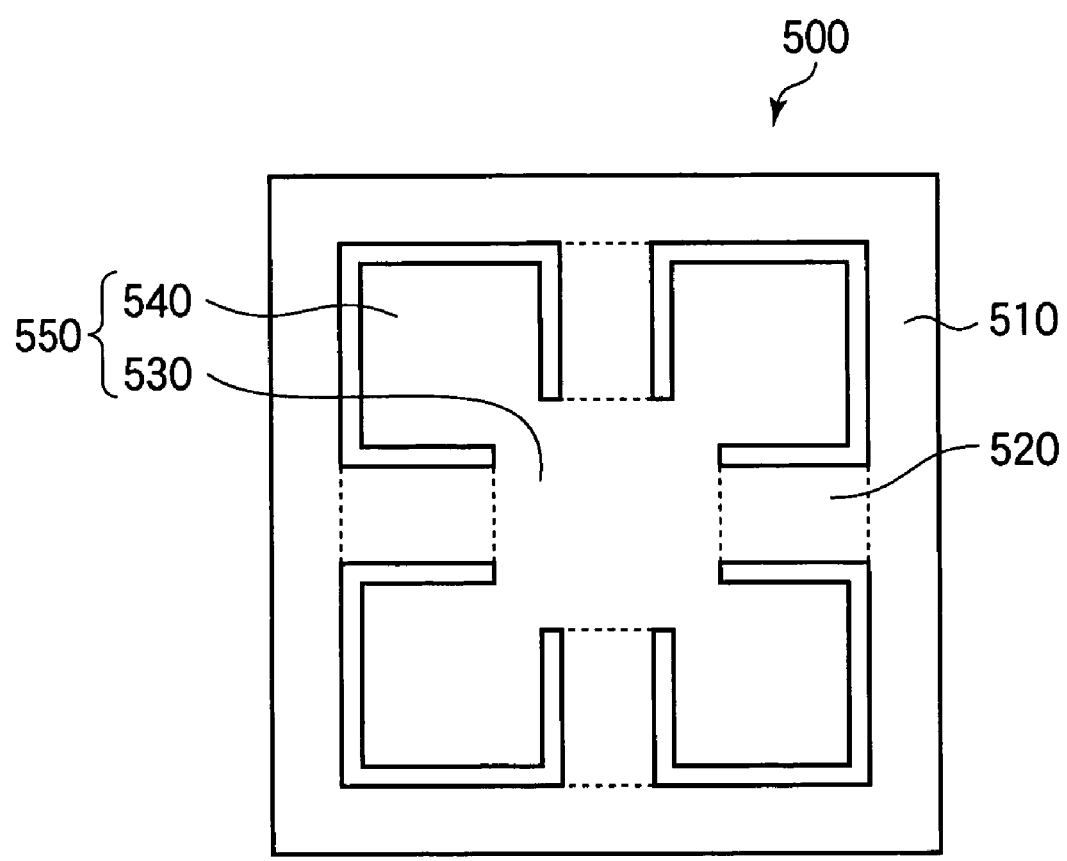
FIG. 22 is a plan view of the acceleration sensor shown in FIG. 21.
Figure 23:
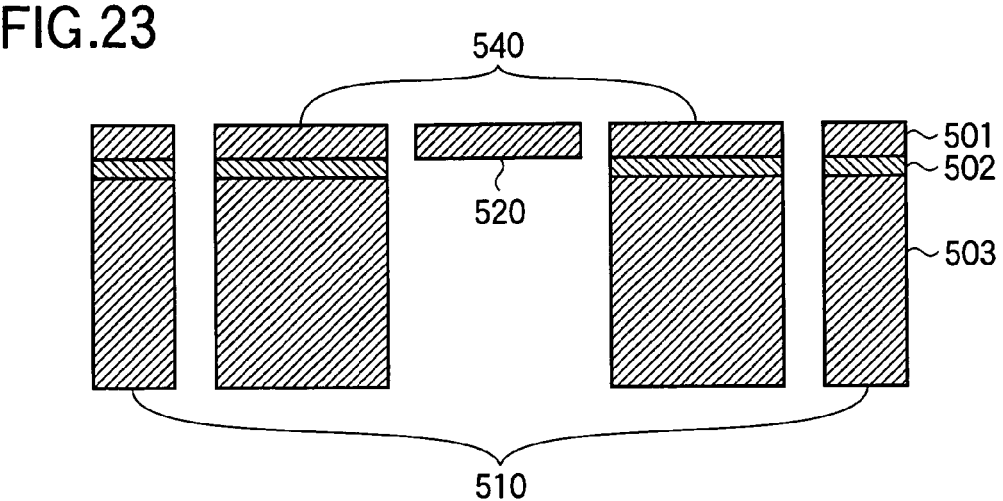
FIG. 23 is a sectional view of the acceleration sensor taken along line XXIII-XXIII shown in FIG. 21.
Figure 24:
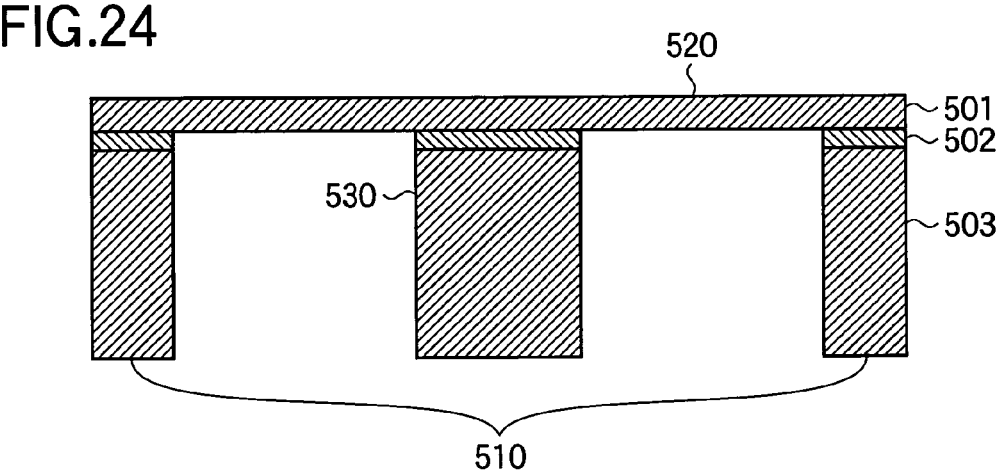
FIG. 24 is a sectional view of the acceleration sensor taken along line XXIV-XXIV shown in FIG. 21.

FIG. 21 is a perspective view of the acceleration sensor according to the comparative example. FIG. 22 is a plan view of the acceleration sensor shown in FIG. 21. FIGS. 23 and 24 are sectional views taken along line XXIII-XXIII and line XXIV-XXIV in FIG. 21.

The acceleration sensor shown in FIG. 21 is made by microfabrication process and made of a laminated board including three layers, i.e., a first layer, a second layer and a third layer. The first layer, the second layer and the third layer are laminated in this order.

As shown in FIG. 21, the acceleration sensor 500 includes a frame-like supporting part 510, beam parts 520 connected to center portions of the respective sides of the supporting part 510 and a weight part 550. The weight part 550 includes a weight connecting portion 530 connected to the beam parts 520 and supplemental weight portions 540 protruding from the weight connecting portion 530 beside the beam parts 520.

In order to enhance the sensitivity of the acceleration sensor, it is preferable to set the distance of the weight connecting portion 530 and the supporting part 510 (i.e., the length of each beam part 520) as long as possible. Thus, the weight connecting portion 530 is disposed as far as possible from the supporting part 510. Further, it is preferable that the weight part 550 is as large as possible, and therefore the supplemental weight portions 540 protrude from the weight connecting portion 530 toward the supporting part 510 as much as possible.

The supporting part 510 is formed to surround the weight part 550. The dashed line shown in FIG. 22 indicates the border between the supporting part 510 and the weight part 550 in the second layer and the third layer. Two kinds of through holes having different widths are formed in the second layer and the third layer (i.e., the layers beneath the uppermost layer). The width of the through hole between the supplemental weight portion 540 and the supporting part 510 is different from the width of the through hole between the weight connecting portion 530 and the supporting part 510.

Figure 26A:
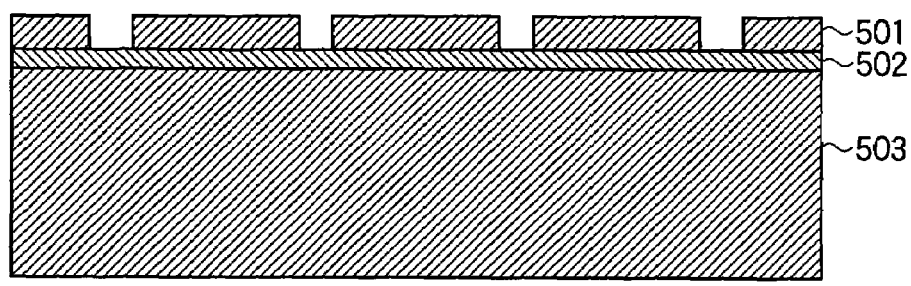
FIGS. 26A and 26B are sectional views showing the manufacturing process of the acceleration sensor taken along lines XXIII-XXIII and XXIV-XXIV shown in FIG. 21.
Figure 26B:
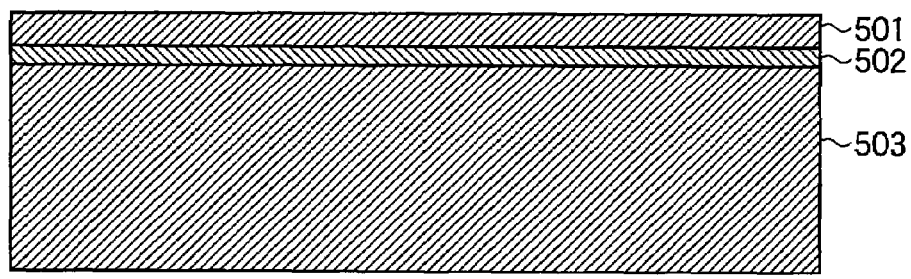
Figure 26C:
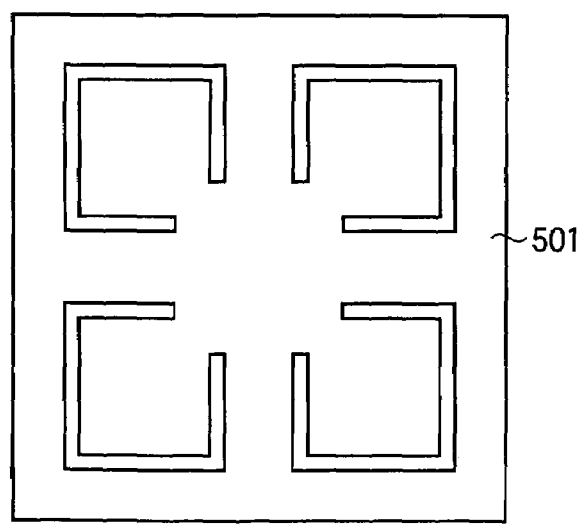
FIG. 26C is a plan view of the first layer of the acceleration sensor according to the comparative example.
Figure 27A:
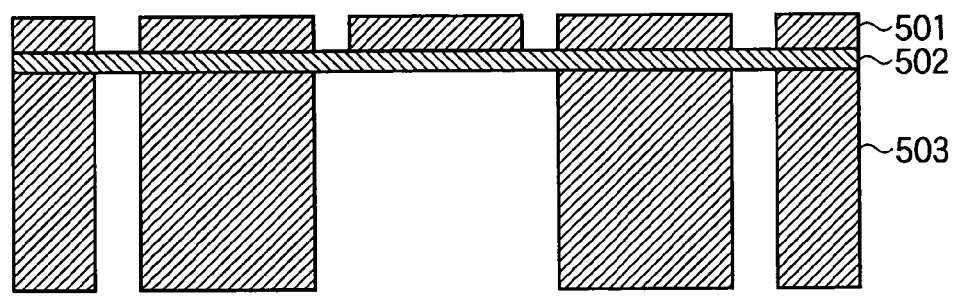
FIGS. 27A and 27B are sectional views showing the manufacturing process of the acceleration sensor taken along lines XXIII-XXIII and XXIV-XXIV shown in FIG. 21.
Figure 27B:
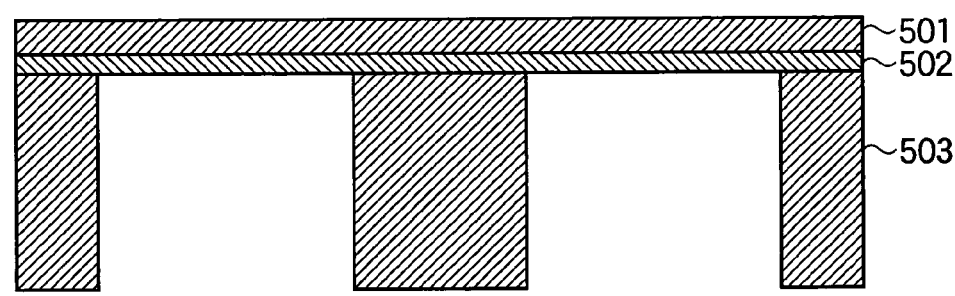
Figure 27C:
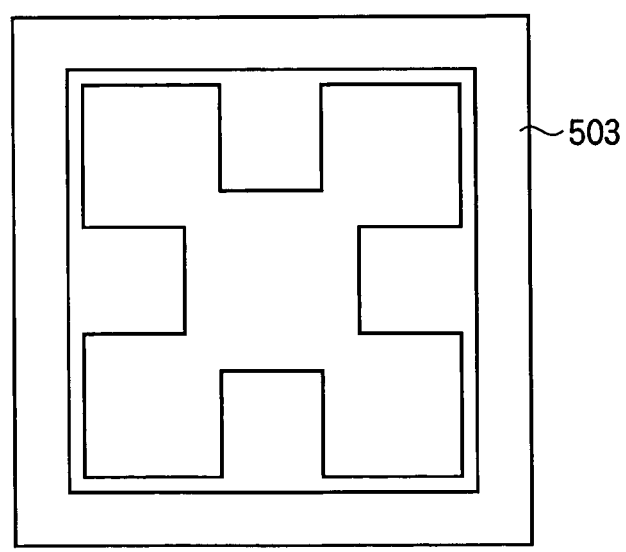
FIG. 27C is a plan view of the second layer of the acceleration sensor according to the comparative example.
Figure 28A:
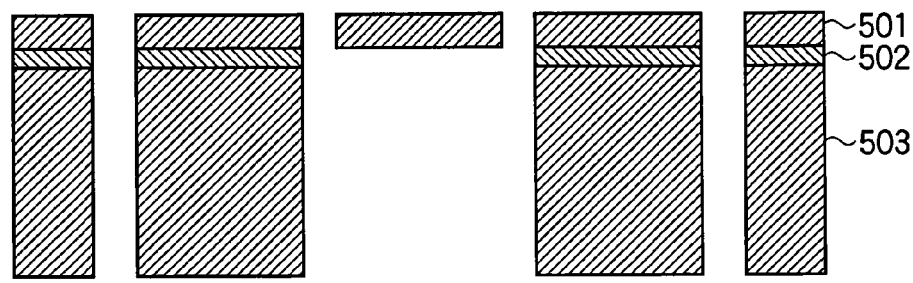
FIGS. 28A and 28B are sectional views showing the manufacturing process of the acceleration sensor taken along lines XXIII-XXIII and XXIV-XXIV shown in FIG. 21.
Figure 28B:
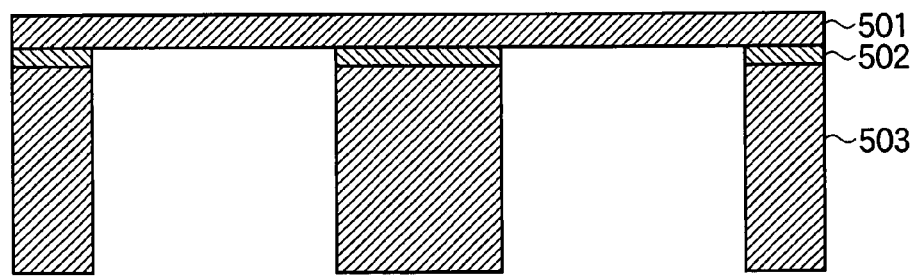
Figure 28C:
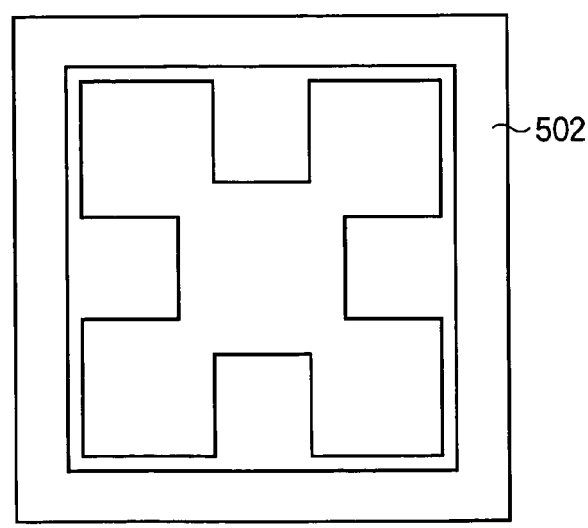
FIG. 28C is a plan view of the third layer of the acceleration sensor according to the comparative example.

FIGS. 26A, 27A and 28A show the manufacturing process of the acceleration sensor in a cross section taken along the line XXIII-XXIII in FIG. 21. FIGS. 26B, 27B and 28B show the manufacturing process of the acceleration sensor in a cross section taken along the line XXIV-XXIV in FIG. 21. FIGS. 26C, 27C and 28C are plan views of the first, second and third layers of the acceleration sensor of FIG. 21.

Figure 25:
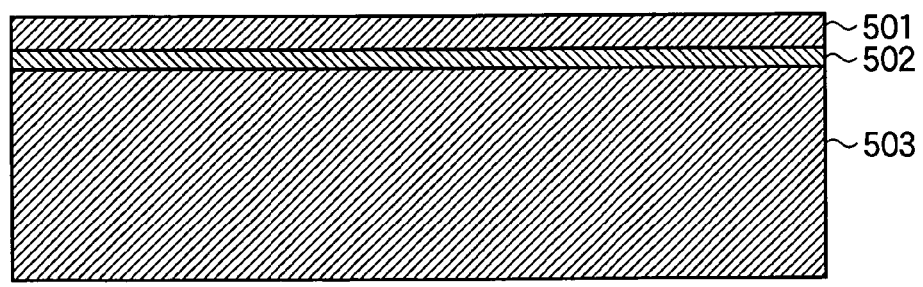
FIG. 25 illustrates a manufacturing process of the acceleration sensor according to the comparative example.

In the manufacturing process, a laminated board including three layers (i.e., a first layer 501, a second layer 502 and a third layer 503) is prepared as shown in FIG. 25. Not shown piezoresistive elements are formed on portions (to be formed into the beam parts 520) on the top surface of the laminated board. Then, the patterning is performed on the top side of the laminated board so that the first layer 501 is patterned as shown in FIG. 26C. In this state, the sectional views of the laminated board taken along line XXIII-XXIII and line XXIV-XXIV of FIG. 21 are as shown in FIGS. 26A and 26B. Next, the patterning is performed on the bottom side of the laminated board so that the third layer 603 is patterned as shown in FIG. 27C. In this state, the sectional views of the laminated board taken along line XXIII-XXIII and line XXIV-XXIV of FIG. 21 are as shown in FIGS. 27A and 27B. Lastly, the second layer 502 is patterned as shown in FIG. 28C. In this state, the sectional views of the laminated board taken along line XXIII-XXIII and line XXIV-XXIV are as shown in FIGS. 28A and 28B.

In order to adjust the sensitivity of the conventional acceleration sensor 500 (FIG. 21), it is necessary to change the positions of the supporting part 510 and the weight part 550 (i.e., the length of the beam parts 520). Thus, it is necessary to change the positions of the through holes formed on the top side and the bottom side of the laminated board, and therefore it is necessary to change the layouts on the top side and the bottom side of the laminated board. Accordingly, the adjustment of the sensitivity is not easily performed.

Additionally, it is difficult to align the through holes formed on the top side and the bottom side of the acceleration sensor 500, and therefore it is necessary to pick up several acceleration sensors 500 as samples and destruct each sample to observe the cross section of each sample using SEM, TEM or the like. Therefore, it is difficult to align the through holes formed on the top side and the bottom side, without destructing the acceleration sensor 500.

Moreover, in the manufacturing process shown in FIGS. 25 through 28C, it is necessary to align the through holes formed on the top side and the bottom side of the acceleration sensor.

However, if the acceleration sensor 500 is observed from above (i.e., the top side), the through hole formed on the bottom side is hidden behind the uppermost layer 501 and can not be observed, and therefore it is difficult to align the through holes formed on both sides. Moreover, since the through hole formed on the bottom side is deeper than the through hole formed on the top side, the position where both through holes meet each other is far from the bottom side. Thus, when the acceleration sensor 500 is observed from the bottom side, it is difficult to determine whether both through holes are aligned with each other.

In contrast, according to the first and second embodiments of the present invention (FIGS. 1 through 20), the length of the deformable portion of each beam part 120 (220) is adjusted by adjusting the amount at which the protruding part 160 (260) contacts the beam part 120. Since it is not necessary to change the length of each beam part 120 (220), it is not necessary to change the layout of the top side of the acceleration sensor. Thus, the sensitivity can be easily adjusted.

Moreover, according to the first and second embodiments of the present invention, the position of the through hole formed on the bottom side can be easily determined by observing the position of the protruding part 160 (260) from the top side of the acceleration sensor. Thus, it becomes easy to align the through holes formed on the top side and the bottom side of the acceleration sensor with each other.

While the preferred embodiments of the present invention have been illustrated in detail, it should be apparent that modifications and improvements may be made to the invention without departing from the spirit and scope of the invention as described in the following claims.

What is claimed is:

1. An acceleration sensor comprising:
a supporting part;
a beam part connected to said supporting part;
a weight part connected to said beam part; and
a protruding part formed beneath said beam part so that said protruding part supports said beam part,
wherein said supporting part comprises a laminated board including a first layer connected to said beam part and a second layer formed beneath said first layer, and said protruding part is formed as the same layer as said second layer.

2. The acceleration sensor according to claim 1, wherein said protruding part is connected to said supporting part.

3. The acceleration sensor according to claim 1, wherein said protruding part is connected to said weight part.

4. The acceleration sensor according to claim 1, further comprising a stopper part connected to said supporting part and extending over said weight part.

5. The acceleration sensor according to claim 1, wherein said protruding part has a first surface, a second surface adjacent to said first surface, a third surface adjacent to said second surface and a connecting plane adjacent to said first surface and third surface, said connecting plane being connected to said supporting part or said weight part, and
wherein said first surface and said third surface are so formed that a cross sectional area of said protruding part in parallel to said second surface increases as the position shifts from said second surface toward said connecting plane.

6. The acceleration sensor according to claim 5, wherein said first surface and said third surface are curved to be recessed toward said connecting plane.

7. The acceleration sensor according to claim 5, wherein said first surface and said third surface are curved to protrude away from said connecting plane.

8. An acceleration sensor comprising:
a flexible beam part having a first end and a second end;
a supporting part connected to said first end of said beam part;
a protruding part that supports said beam part; and
a weight part including a weight connecting portion connected to said second end of said beam part and a supplemental weight portion disposed in a vicinity of said beam part and extending from said weight connecting portion toward said supporting part,
wherein said supporting part comprises a laminated board including a first layer connected to said beam part and a second layer formed beneath said first layer, and said protruding part is formed as the same layer as said second layer.

9. The acceleration sensor according to claim 8, wherein said protruding part comprises a first protruding portion that supports said beam part and a second protruding portion adjacent to said first protruding portion.

10. The acceleration sensor according to claim 8, wherein the dimension of said beam part in a width direction thereof is smaller than the dimension of said protruding part in said width direction.

11. The acceleration sensor according to claim 8, wherein said protruding part is connected to said supporting part.

12. The acceleration sensor according to claim 8, wherein said protruding part is connected to said weight part.

13. The acceleration sensor according to claim 12, wherein said weight part comprises a laminated board including a layer formed as the same layer as said first layer connected to said beam part and another layer formed therebeneath as the same layer as said second layer.

14. An acceleration sensor comprising a first layer and a second layer formed beneath said first layer,
wherein said first layer comprises:
a first supporting part;
a first weight part including a first weight connecting portion and a first supplemental weight portion connected to said first weight connecting portion;
a beam part connecting said first supporting part and said first weight connecting portion, and
a first through hole that defines said first supporting part, said first weight part and said beam part,
wherein said second layer comprises:
a second supporting part formed beneath said first supporting part;
a second weight part including a second weight connecting portion formed beneath said first weight connecting portion and a second supplemental weight portion formed beneath said first supplemental weight portion;
a protruding part formed beneath said beam part, and
a second through hole that defines said second supporting part, said second weight part and said protruding part,
and wherein said protruding part supports said beam part.

15. The acceleration sensor according to claim 14, wherein said first supplemental weight portion and said second supplemental weight portion are disposed in the vicinity of said beam part and respectively extend from said first weight connecting portion and said second weight connecting portion toward said first supporting part and said second supporting part.

16. An acceleration sensor comprising a first layer, a second layer formed provided beneath said first layer and a third layer formed beneath said second layer, wherein said first layer comprises:

a first supporting part;

a first weight part including a first weight connecting portion;

a beam part connecting said first supporting part and said first weight connecting portion;

a stopper part, and a first through hole that defines said first supporting part, said first weight part, said beam part and said stopper part, wherein said second layer comprises:

a second supporting part formed beneath said first supporting part;

a second weight part including a second weight connecting portion formed beneath said first weight connecting portion;

a protruding part formed beneath said beam part, and a second through hole that defines said second supporting part, said second weight part and said protruding part, wherein said third layer comprises:

a third supporting part formed beneath said second supporting part;

a third weight part including a third weight connecting portion formed beneath said second weight connecting portion and a supplemental weight portion connected to said third weight connecting portion, a third through hole that defines said third supporting part and said third weight part, and wherein said protruding part supports said beam part.

17. The acceleration sensor according to claim 16, wherein said supplemental weight portion is provided in the vicinity of said beam part and extends from said third weight connecting portion toward said third supporting part.

18. The acceleration sensor according to claim 16, wherein said third through hole of said third layer is so formed as to define another protruding part formed beneath said protruding part of said second layer.

* * * * *